(12) United States Patent
Suzuki et al.

(10) Patent No.: US 12,438,897 B2
(45) Date of Patent: Oct. 7, 2025

(54) THRESHOLD VALUE CALCULATION DEVICE, ANOMALY DETECTION DEVICE, THRESHOLD VALUE CALCULATION METHOD, AND ANOMALY DETECTION METHOD

(71) Applicant: Panasonic Intellectual Property Corporation of America, Torrance, CA (US)

(72) Inventors: Yusuke Suzuki, Osaka (JP); Moe Yoshida, Osaka (JP); Hiroyasu Terazawa, Osaka (JP); Seiichi Muroya, Osaka (JP); Toshimasa Takaki, Tokyo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 173 days.

(21) Appl. No.: 18/211,941

(22) Filed: Jun. 20, 2023

(65) Prior Publication Data

US 2023/0336576 A1     Oct. 19, 2023

Related U.S. Application Data

(63) Continuation of application No. PCT/JP2021/042362, filed on Nov. 18, 2021.

(30) Foreign Application Priority Data

Dec. 24, 2020   (JP) ................................ 2020-214471

(51) Int. Cl.
H04L 9/40          (2022.01)
(52) U.S. Cl.
CPC ............................... H04L 63/1425 (2013.01)

(58) Field of Classification Search
CPC ... H04L 63/1425; H04L 67/12; H04L 67/125; H04L 63/20; H04L 63/1416; H04L 43/16; H04L 41/16; H04L 67/535; H04L 63/14; H04L 63/10; H04L 63/1433; H04L 43/12; H04L 12/2803; H04L 63/02; H04L 63/105; H04L 63/1441; H04L 43/065
See application file for complete search history.

(56) References Cited

FOREIGN PATENT DOCUMENTS

JP          2004-312064          11/2004

OTHER PUBLICATIONS

International Search Report (ISR) from International Searching Authority (Japan Patent Office) in International Pat. Appl. No. PCT/JP2021/042362, dated Feb. 1, 2022, together with an English language translation.

*Primary Examiner* — Ryan J Jakovac
(74) *Attorney, Agent, or Firm* — Greenblum and Bernstein, P.L.C.

(57) ABSTRACT

A threshold value calculation device includes: a device state acquirer that acquires a device state of a first device provided in a facility in which a home network is installed during a first period; an occupancy state determiner that determines an occupancy state by people in the facility during the first period based on information acquired from a second device in the facility; a communication log collector that collects a communication log; and a learner that calculates a threshold value for the communication transmitted and received by the first device during a second period that is a period after the first period. The learner calculates the threshold value for each of combinations of one or more states of the first device and one or more states of the people.

13 Claims, 16 Drawing Sheets

FIG. 3

| Device identifier | Type of device | Device state |
|---|---|---|
| 11:11:11:11:11:11 | Air conditioner | Power on |
| 22:22:22:22:22:22 | Gas water heater | Power off |
| 33:33:33:33:33:33 | Electric lock | Unlocked |
| 44:44:44:44:44:44 | Light | Power on |
| 55:55:55:55:55:55 | TV | Power off |
| 66:66:66:66:66:66 | Recorder | Power off |
| 77:77:77:77:77:77 | Controller | Power on |
| 88:88:88:88:88:88 | Smartphone | Power on |
| 99:99:99:99:99:99 | PC | Power off |
| : | : | : |

FIG. 4

| Device state of air conditioner | Device state of electric lock | Device state of TV | Device state of smartphone | ... | Occupancy state |
|---|---|---|---|---|---|
| Power off | Locked | Power off | Power off | ... | Vacant |
| Power off | Locked | Power off | Power on | ... | Occupied |
| Power off | Locked | Power on | Power off | ... | Vacant |
| Power off | Locked | Power on | Power on | ... | Occupied |
| Power off | Unlocked | Power off | Power off | ... | Occupied |
| Power off | Unlocked | Power off | Power on | ... | Occupied |
| Power off | Unlocked | Power on | Power off | ... | Occupied |
| Power off | Unlocked | Power on | Power on | ... | Occupied |
| Power on | Locked | Power off | Power off | ... | Vacant |
| Power on | Locked | Power off | Power on | ... | Occupied |
| Power on | Locked | Power on | Power off | ... | Vacant |
| Power on | Locked | Power on | Power on | ... | Occupied |
| Power on | Unlocked | Power off | Power off | ... | Occupied |
| Power on | Unlocked | Power off | Power on | ... | Occupied |
| Power on | Unlocked | Power on | Power off | ... | Occupied |
| Power on | Unlocked | Power on | Power on | ... | Occupied |

FIG. 5

| Communication date and time | Transmission source identifier | Transmission destination identifier | Communication protocol | Communication volume | Type of online communication |
|---|---|---|---|---|---|
| 2020/11/1 13:00:00 | 11:11:11:11:11:11 | 77:77:77:77:77:77 | ECHONET Lite | 100 Byte | Local communication |
| 2020/11/1 13:15:00 | 11:11:11:11:11:11 | uuu.uuu.uuu.uuu | ECHONET Lite | 500 Byte | Global communication |
| 2020/11/1 13:30:00 | 11:11:11:11:11:11 | 77:77:77:77:77:77 | ECHONET Lite | 150 Byte | Local communication |
| 2020/11/1 13:45:00 | 11:11:11:11:11:11 | uuu.uuu.uuu.uuu | ECHONET Lite | 750 Byte | Global communication |
| 2020/11/2 14:00:00 | 11:11:11:11:11:11 | 77:77:77:77:77:77 | ECHONET Lite | 1,000 Byte | Local communication |
| 2020/11/2 14:15:00 | 11:11:11:11:11:11 | uuu.uuu.uuu.uuu | ECHONET Lite | 5,000 Byte | Global communication |
| 2020/11/2 14:30:00 | 11:11:11:11:11:11 | 77:77:77:77:77:77 | ECHONET Lite | 1,500 Byte | Local communication |
| 2020/11/2 14:45:00 | 11:11:11:11:11:11 | uuu.uuu.uuu.uuu | ECHONET Lite | 7,500 Byte | Global communication |
| 2020/11/3 15:00:00 | 11:11:11:11:11:11 | 77:77:77:77:77:77 | ECHONET Lite | 50 Byte | Local communication |
| 2020/11/3 15:15:00 | 11:11:11:11:11:11 | uuu.uuu.uuu.uuu | ECHONET Lite | 1,000 Byte | Global communication |
| 2020/11/3 15:30:00 | 11:11:11:11:11:11 | 77:77:77:77:77:77 | ECHONET Lite | 75 Byte | Local communication |
| 2020/11/3 15:45:00 | 11:11:11:11:11:11 | uuu.uuu.uuu.uuu | ECHONET Lite | 1,500 Byte | Global communication |
| 2020/11/4 16:00:00 | 11:11:11:11:11:11 | 77:77:77:77:77:77 | ECHONET Lite | 500 Byte | Local communication |
| 2020/11/4 16:15:00 | 11:11:11:11:11:11 | uuu.uuu.uuu.uuu | ECHONET Lite | 10,000 Byte | Global communication |
| 2020/11/4 16:30:00 | 11:11:11:11:11:11 | 77:77:77:77:77:77 | ECHONET Lite | 750 Byte | Local communication |
| 2020/11/4 16:45:00 | 11:11:11:11:11:11 | uuu.uuu.uuu.uuu | ECHONET Lite | 15,000 Byte | Global communication |
| : | : | : | : | : | : |

FIG. 6

| Communication date and time | Device identifier | Device state | Occupancy state | Communication volume | Type of online communication |
|---|---|---|---|---|---|
| 2020/11/1 13:00:00 | 11:11:11:11:11:11 | Power off | Vacant | 100 Byte | Local communication |
| 2020/11/1 13:15:00 | 11:11:11:11:11:11 | Power off | Vacant | 500 Byte | Global communication |
| 2020/11/1 13:30:00 | 11:11:11:11:11:11 | Power off | Occupied | 150 Byte | Local communication |
| 2020/11/1 13:45:00 | 11:11:11:11:11:11 | Power off | Occupied | 750 Byte | Global communication |
| 2020/11/2 14:00:00 | 11:11:11:11:11:11 | Power on | Vacant | 1,000 Byte | Local communication |
| 2020/11/2 14:15:00 | 11:11:11:11:11:11 | Power on | Vacant | 5,000 Byte | Global communication |
| 2020/11/2 14:30:00 | 11:11:11:11:11:11 | Power on | Occupied | 1,500 Byte | Local communication |
| 2020/11/2 14:45:00 | 11:11:11:11:11:11 | Power off | Occupied | 7,500 Byte | Global communication |
| 2020/11/3 15:00:00 | 11:11:11:11:11:11 | Power off | Vacant | 50 Byte | Local communication |
| 2020/11/3 15:15:00 | 11:11:11:11:11:11 | Power off | Vacant | 1,000 Byte | Global communication |
| 2020/11/3 15:30:00 | 11:11:11:11:11:11 | Power off | Occupied | 75 Byte | Local communication |
| 2020/11/3 15:45:00 | 11:11:11:11:11:11 | Power off | Occupied | 1,500 Byte | Global communication |
| 2020/11/4 16:00:00 | 11:11:11:11:11:11 | Power on | Vacant | 500 Byte | Local communication |
| 2020/11/4 16:15:00 | 11:11:11:11:11:11 | Power on | Vacant | 10,000 Byte | Global communication |
| 2020/11/4 16:30:00 | 11:11:11:11:11:11 | Power on | Occupied | 750 Byte | Local communication |
| 2020/11/4 16:45:00 | 11:11:11:11:11:11 | Power on | Occupied | 15,000 Byte | Global communication |
| : | : | : | : | : | : |

FIG. 7

| Device identifier | Device state | Occupancy state | Type of online communication | Threshold value (minimum value/ maximum value) |
|---|---|---|---|---|
| 11:11:11:11:11:11 | Power off | Vacant | Local communication | 50/100 Byte |
| 11:11:11:11:11:11 | Power off | Vacant | Global communication | 500/1000 Byte |
| 11:11:11:11:11:11 | Power off | Occupied | Local communication | 75/150 Byte |
| 11:11:11:11:11:11 | Power off | Occupied | Global communication | 750/1,500 Byte |
| 11:11:11:11:11:11 | Power on | Vacant | Local communication | 500/1,000 Byte |
| 11:11:11:11:11:11 | Power on | Vacant | Global communication | 5,000/10,000 Byte |
| 11:11:11:11:11:11 | Power on | Occupied | Local communication | 750/1,500 Byte |
| 11:11:11:11:11:11 | Power on | Occupied | Global communication | 7,500/15,000 Byte |
| ... | | | | ... | und # THRESHOLD VALUE CALCULATION DEVICE, ANOMALY DETECTION DEVICE, THRESHOLD VALUE CALCULATION METHOD, AND ANOMALY DETECTION METHOD

CROSS REFERENCE TO RELATED APPLICATIONS

This is a continuation application of PCT International Application No. PCT/JP2021/042362 filed on Nov. 18, 2021, designating the United States of America, which is based on and claims priority of Japanese Patent Application No. 2020-214471 filed on Dec. 24, 2020. The entire disclosures of the above-identified applications, including the specifications, drawings and claims are incorporated herein by reference in their entirety.

FIELD

The present disclosure relates to a threshold value calculation device, an anomaly detection device, a threshold value calculation method, and an anomaly detection method.

BACKGROUND

In recent years, various types of IoT (Internet of Things) devices in a home have started to be connected to the Internet via a home router. As a result of the home IoT devices being connected to the Internet, functions such as a remote control function, a state monitoring function, and a device cooperation function have been achieved.

On the other hand, widely used home network protocols such as ECHONET Lite (registered trademark, the same applies hereinafter), UPnP (Universal Plug and Play), and DLNA (registered trademark, the same applies hereinafter) (Digital Living Network Alliance) do not include security measures such as communication encryption.

Furthermore, unlike conventional IT (Information Technology) devices such as personal computers, it is often the case that security software such as antivirus software cannot be installed on home IoT devices. For this reason, cyber attacks targeting devices in a home that are connected to a home network (for example, Local Area Network (LAN), or the like) are also happening.

For example, when home IoT devices are maliciously manipulated through cyber attacks, the following consequences may occur: a smart television set may be infected with a virus; video images captured by a security camera may be published on an online network; and a home IoT device that has been maliciously manipulated may be involved in an attack on another server on the Internet. Furthermore, when a home IoT device used as a medical device is maliciously manipulated through a cyber attack, it may result in a life-threatening situation.

For this reason, it is important to monitor network traffic even on a home network and detect anomalies in home IoT devices caused by unauthorized access, virus infection, and the like.

As methods for detecting anomalies on networks, the following methods are known: a signature detection method in which an anomaly is detected by comparing a known pattern (signature) of anomalous packets and a pattern of packets transmitted on a network; and an anomaly detection method in which an anomaly is detected by comparing a pattern of normal packets and a pattern of packets transmitted on a network (see, for example, Patent Literature (PTL) 1).

However, with the signature detection method, it is required to set the pattern of anomalous packets in advance. Accordingly, it is not possible to detect unknown anomalies such as unknown viruses.

On the other hand, with the anomaly detection method, the pattern of normal packets is learned by using a machine learning technique as in PTL 1, and all packet patterns that do not match the learned model are detected as anomalies, and it is therefore possible to detect unknown anomalies such as unknown viruses.

CITATION LIST

Patent Literature

[PTL 1]
Japanese Unexamined Patent Application Publication No. 2004-312064

SUMMARY

Technical Problem

However, with the method disclosed in PTL 1, although anomaly detection is performed by learning the packet pattern of the device performing normal operation, when, for example, the communication usage varies according to changes in the in-facility condition, the anomaly detection may not be performed accurately.

Accordingly, in order to solve the problem described above, the present disclosure provides a threshold value calculation device, an anomaly detection device, a threshold value calculation method, and an anomaly detection method, with which it is possible to perform anomaly detection more accurately.

Solution to Problem

A threshold value calculation device according to one aspect of the present disclosure is a threshold value calculation device that calculates a threshold value used by an anomaly detection device that detects anomalous communication of a first device that is connected to an in-facility network and provided in a facility in which the in-facility network is installed and a second device that is different from the first device is provided, the threshold value calculation device including: a first device state acquirer that acquires a device state of the first device during a first period; a first occupancy state determiner that determines an occupancy state by people in the facility during the first period based on information acquired from the second device; a first communication log collector that collects a communication log generated based on communication transmitted and received by the first device during the first period; and a calculator that calculates the threshold value for the communication transmitted and received by the first device during a second period that is a period after the first period based on the device state, the occupancy state, and the communication log, wherein the device state includes one or more states of the first device, the occupancy state includes one or more states of the people, and the calculator calculates the threshold value for each of combinations of the one or more states of the first device and the one or more states of the people.

An anomaly detection device according to one aspect of the present disclosure is an anomaly detection device that detects anomalous communication of a first device that is connected to an in-facility network and provided in a facility in which the in-facility network is installed and a second device that is different from the first device is provided, the anomaly detection device including: a second device state acquirer that acquires a device state of the first device during a second period that is a period after the first period; a second occupancy state determiner that determines an occupancy state by people in the facility during the second period based on information acquired from the second device; a second communication log collector that collects a communication log generated based on communication transmitted and received by the first device during the second period; and an anomaly detector that selects a threshold value corresponding to the device state and the occupancy state during the second period from among threshold values calculated by the threshold value calculation device described above for combinations of the one or more states of the first device and the one or more states of the people, and detects the anomalous communication of the first device during the second period based on the threshold value selected and the communication log during the second period.

A threshold value calculation method according to one aspect of the present disclosure is a threshold value calculation method for calculating a threshold value used by an anomaly detection device that detects anomalous communication of a first device that is connected to an in-facility network and provided in a facility in which the in-facility network is installed and a second device that is different from the first device is provided, the threshold value calculation method including: acquiring a device state of the first device during a first period; determining an occupancy state by people in the facility during the first period based on information acquired from the second device; collecting a communication log generated based on communication transmitted and received by the first device during the first period; and calculating the threshold value for the communication transmitted and received by the first device during a second period that is a period after the first period based on the device state, the occupancy state, and the communication log, wherein the device state includes one or more states of the first device, the occupancy state includes one or more states of the people, and the calculating the threshold value includes calculating the threshold value for each of combinations of the one or more states of the first device and the one or more states of the people.

An anomaly detection method according to one aspect of the present disclosure is an anomaly detection method for detecting anomalous communication of a first device that is connected to an in-facility network and provided in a facility in which the in-facility network is installed and a second device that is different from the first device is provided, the anomaly detection method including: acquiring a device state of the first device during a second period that is a period after the first period; determining an occupancy state by people in the facility during the second period based on information acquired from the second device; collecting a communication log generated based on communication transmitted and received by the first device during the second period; and selecting a threshold value corresponding to the device state and the occupancy state during the second period from among threshold values calculated by the threshold value calculation method described above for combinations of the one or more states of the first device and the one or more states of the people, and detecting the anomalous communication of the first device during the second period based on the threshold value selected and the communication log during the second period.

Advantageous Effects

According to the present disclosure, it is possible to implement a threshold value calculation device and the like, with which it is possible to perform anomaly detection more accurately.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3 is a diagram showing an example of device state data according to the embodiment.

FIG. 4 is a diagram showing an example of occupancy state data according to the embodiment.

FIG. 5 is a diagram showing an example of a communication log according to the embodiment.

FIG. 6 is a diagram showing an example of learning data according to the embodiment.

FIG. 7 is a diagram showing an example of threshold value data according to the embodiment.

Figure 1:
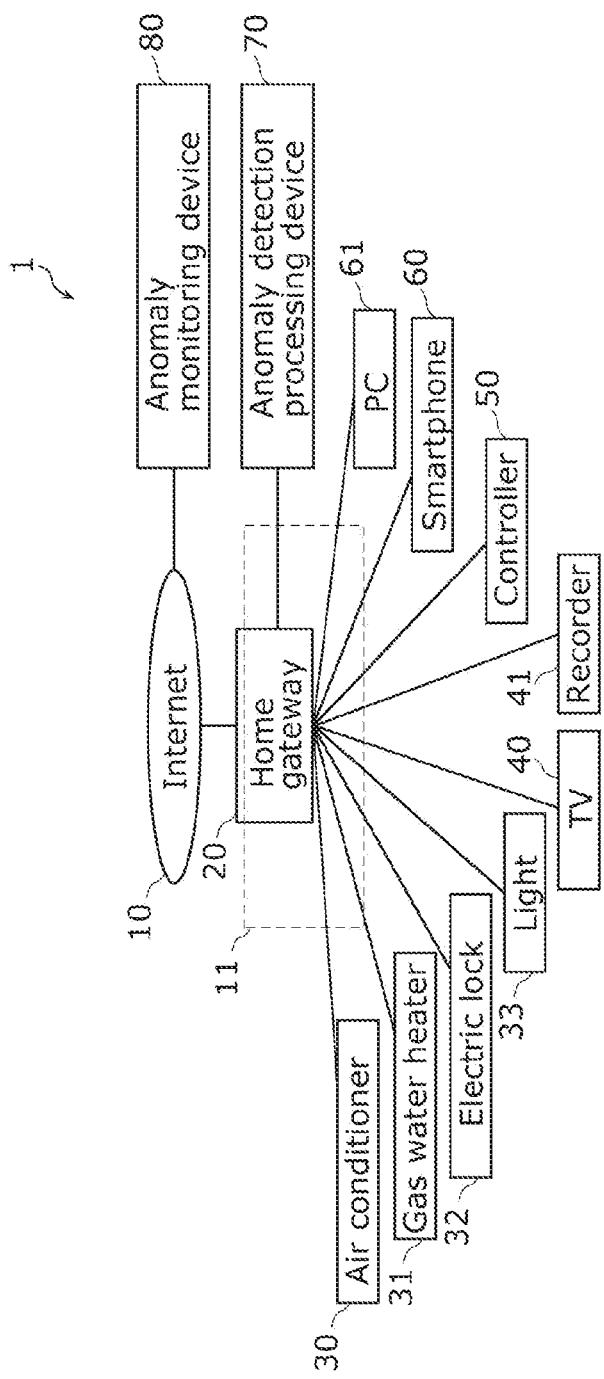
FIG. 1 is a diagram showing an overall configuration of an anomaly detection system according to an embodiment.

DESCRIPTION OF EMBODIMENTS (Circumstances Leading to the Present Disclosure)

As described in the Technical Problem section given above, with the method disclosed in PTL 1, when, for example, the communication usage varies according to changes in the in-facility condition, the anomaly detection may not be performed accurately. For example, the device usage of home IoT devices varies depending on the number of residents at home, the attributes of residents, and the like. Accordingly, the use of the packet pattern of the device performing normal operation alone may cause an erroneous detection, a detection failure, and the like.

For example, when a light is illuminated and a smart television set is turned on while nobody is at home, information indicating that an anomaly has occurred should be issued as a result of detection. However, it is not possible to determine whether someone is at home. Accordingly, the anomaly cannot be detected, which may cause a detection failure.

Alternatively, when someone other than residents such as a guest visits the home, and a new terminal is connected, the communication volume increases due to the guest being added to the headcount in the home, which may be detected as an anomaly and determined as an erroneous detection.

As described above, with the conventional techniques, anomaly detection is performed without taking the occupancy state by residents into consideration. Accordingly, when, for example, the communication usage varies according to changes in the in-facility condition, the anomaly detection may not be performed accurately, which may cause a detection failure or an erroneous detection.

To address the problem described above, the inventors of the present application conducted in-depth studies on a threshold value calculation device, an anomaly detection device, a threshold value calculation method, and an anomaly detection method, with which it is possible to perform anomaly detection more accurately, and invented a threshold value calculation device, an anomaly detection device, a threshold value calculation method, and an anomaly detection method that are described below.

A threshold value calculation device according to one aspect of the present disclosure is a threshold value calculation device that calculates a threshold value used by an anomaly detection device that detects anomalous communication of a first device that is connected to an in-facility network and provided in a facility in which the in-facility network is installed and a second device that is different from the first device is provided, the threshold value calculation device including: a first device state acquirer that acquires a device state of the first device during a first period; a first occupancy state determiner that determines an occupancy state by people in the facility during the first period based on information acquired from the second device; a first communication log collector that collects a communication log generated based on communication transmitted and received by the first device during the first period; and a calculator that calculates the threshold value for the communication transmitted and received by the first device during a second period that is a period after the first period based on the device state, the occupancy state, and the communication log, wherein the device state includes one or more states of the first device, the occupancy state includes one or more states of the people, and the calculator calculates the threshold value for each of combinations of the one or more states of the first device and the one or more states of the people.

With this configuration, the threshold value is calculated for each of the combinations of the device state and the occupancy state. Accordingly, as a result of the anomaly detection device detecting a communication anomaly during the second period by using the threshold value corresponding to the device state and the occupancy state during the second period, the anomaly detection can be performed more accurately as compared with the case where a communication anomaly is detected by using the packet pattern of the device performing normal operation without depending on the in-facility condition as in PTL 1. Accordingly, the anomaly detection can be performed more accurately by using the threshold value calculated by the threshold value calculation device.

Also, for example, the first device state acquirer may acquire, as the device state, at least one of a power state or a setpoint value of the first device based on communication that includes a device control command for controlling the first device.

With this configuration, the calculator can calculate the threshold value for each of at least one of the power state and the setpoint value. In the case where the anomaly detection device detects an anomaly by using the threshold value corresponding to at least one of the power state and the setpoint value during the second period, the anomaly detection based on at least one of the power state and the setpoint value during the second period can be performed more accurately. Accordingly, by using the threshold value calculated by the threshold value calculation device, the anomaly detection based on at least one of the power state and the setpoint value during the second period can be performed more accurately.

Also, for example, the first occupancy state determiner may determine the occupancy state based on information acquired from the first device or a third device that is different from the first device and the second device.

With this configuration, the occupancy state is determined by also using the information acquired from a device other than the second device. Accordingly, the occupancy state can be determined and confirmed more accurately. This leads to more accurate anomaly detection.

Also, for example, the communication log may include type information indicating a type of online communication determined based on a transmission destination identifier specified in the communication log, the type information may include one or more types of online communication in the communication log, and the calculator may further calculate the threshold value for each of combinations of the one or more types of online communication.

With this configuration, the threshold value is further calculated for each of the combinations of the one or more types of online communication. That is, the threshold value can be calculated for each communication transmission destination. When the anomaly detection device performs anomaly detection by using the threshold value corresponding to the type of online communication of the communication during the second period, the anomaly detection can be performed more accurately in the case of the type of online communication. Accordingly, by using the threshold value calculated by the threshold value calculation device, the anomaly detection can be performed more accurately when the type information includes one or more types of online communication.

Also, for example, the calculator may generate learning data in which the device state, the occupancy state, and the communication log are associated with one another, and calculate the threshold value based on the learning data.

With this configuration, learning data is generated in advance. Accordingly, the threshold value can be calculated by simply extracting required data from the learning data, and it is therefore possible to easily calculate the threshold value.

Also, for example, the occupancy state may include an occupied state of the facility by the people and a vacant state, and the calculator may calculate the threshold value for each of the occupied state and the vacant state.

With this configuration, the calculator can calculate the threshold value for each of the occupied state and the vacant state. When the anomaly detection device performs anomaly detection by using the threshold value corresponding to either the occupied state or the vacant state during the second period, the anomaly detection can be performed more accurately in the case of the occupancy state being either the occupied state or the vacant state. Accordingly, by using the threshold value calculated by the threshold value calculation device, the anomaly detection can be performed more accurately in the case of the occupancy state being either the occupied state or the vacant state.

Also, for example, the occupancy state may include at least one of a headcount or a location of the people in the facility, and the calculator may calculate the threshold value for each of the at least one of the headcount or the location.

With this configuration, the calculator can calculate the threshold value for each of at least one of the headcount or the location of the people. When the anomaly detection device performs anomaly detection by using the threshold value corresponding to at least one of the headcount or the location of the people during the second period, the anomaly detection based on at least one of the headcount or the location of the people during the second period can be performed more accurately. Accordingly, by using the threshold value calculated by the threshold value calculation device, the anomaly detection based on at least one of the headcount or the location of the people can be performed more accurately.

Also, for example, the occupancy state may include one or more items of activity information of the people during the first period, and the calculator may further calculate the threshold value based on the one or more items of activity information.

With this configuration, the threshold value is further calculated for each of the combinations of one or more items of activity information of the people. That is, the threshold value can be calculated for each item of human activity information. When the anomaly detection device performs anomaly detection by using the threshold value corresponding to the human activity information during the second period, the anomaly detection can be performed more accurately in the case where the activity information is used. Accordingly, by using the threshold value calculated by the threshold value calculation device, the anomaly detection when the occupancy state includes one or more items of human activity information can be performed more accurately.

Also, for example, the threshold value may be a threshold value for a communication volume of the first device, and include a maximum value and a minimum value of the communication volume.

With this configuration, it is possible to calculate the threshold value based on which both an anomaly when the communication volume is large and an anomaly when the communication volume is small can be detected. By using the threshold value described above, the anomaly detection can be performed more accurately as compared with the case where the threshold value includes only either one of an upper limit value or a lower limit value.

Also, an anomaly detection device according to one aspect of the present disclosure is an anomaly detection device that detects anomalous communication of a first device that is connected to an in-facility network and provided in a facility in which the in-facility network is installed and a second device that is different from the first device is provided, the anomaly detection device including: a second device state acquirer that acquires a device state of the first device during a second period that is a period after the first period; a second occupancy state determiner that determines an occupancy state by people in the facility during the second period based on information acquired from the second device; a second communication log collector that collects a communication log generated based on communication transmitted and received by the first device during the second period; and an anomaly detector that selects a threshold value corresponding to the device state and the occupancy state during the second period from among threshold values calculated by the threshold value calculation device described above for combinations of the one or more states of the first device and the one or more states of the people, and detects the anomalous communication of the first device during the second period based on the threshold value selected and the communication log during the second period.

With this configuration, the anomaly detection device can detect a communication anomaly during the second period by using the threshold value corresponding to the device state and the occupancy state during the second period from among the threshold values calculated for the combinations of the device state and the occupancy state. As a result of the anomaly detection device detecting a communication anomaly by using the threshold value corresponding to the device state and the occupancy state during the second period, the anomaly detection can be performed more accurately as compared with the case where a communication anomaly is detected by using the packet pattern of the device performing normal operation without depending on the in-facility condition as in PTL 1.

Also, for example, the anomaly detector may compare the threshold value selected with the communication log, and when the communication log does not satisfy the threshold value, the anomaly detector may determine that an anomaly has occurred, and outputs a result of the determination.

With this configuration, when an anomaly is detected, the anomaly detection device can provide a notification indicating the occurrence of the anomaly.

Also, a threshold value calculation method according to one aspect of the present disclosure is a threshold value calculation method for calculating a threshold value used by an anomaly detection device that detects anomalous communication of a first device that is connected to an in-facility network and provided in a facility in which the in-facility network is installed and a second device that is different from the first device is provided, the threshold value calculation method including: acquiring a device state of the first device during a first period; determining an occupancy state by people in the facility during the first period based on information acquired from the second device; collecting a communication log generated based on communication transmitted and received by the first device during the first period; and calculating the threshold value for the communication transmitted and received by the first device during a second period that is a period after the first period based on the device state, the occupancy state, and the communication log, wherein the device state includes one or more states of the first device, the occupancy state includes one or more states of the people, and the calculating the threshold value includes calculating the threshold value for each of combinations of the one or more states of the first device and the one or more states of the people.

With this configuration, the same advantageous effects as those of the threshold value calculation device can be obtained.

Also, an anomaly detection method according to one aspect of the present disclosure is an anomaly detection method for detecting anomalous communication of a first device that is connected to an in-facility network and provided in a facility in which the in-facility network is installed and a second device that is different from the first device is provided, the anomaly detection method including: acquiring a device state of the first device during a second period that is a period after the first period; determining an occupancy state by people in the facility during the second period based on information acquired from the second device; collecting a communication log generated based on communication transmitted and received by the first device during the second period; and selecting a threshold value corresponding to the device state and the occupancy state during the second period from among threshold values calculated by the threshold value calculation method described above for combinations of the one or more states of the first device and the one or more states of the people, and detecting the anomalous communication of the first device during the second period based on the threshold value selected and the communication log during the second period.

With this configuration, the same advantageous effects as those of the anomaly detection device can be obtained.

Hereinafter, the configuration of an anomaly detection system according to an embodiment of the present disclosure, the configurations of a threshold value calculation device and an anomaly detection device according to the embodiment of the present disclosure, and processing flows performed by the threshold value calculation device and the anomaly detection device will be described with reference to the drawings.

Note that the embodiment described below shows a preferred specific example of the present disclosure. That is, the numerical values, shapes, materials, structural elements, the arrangement and connection of the structural elements, steps, the order of the steps, and the like shown in the following embodiment are merely examples of the present disclosure, and therefore are not intended to limit the scope of the present disclosure.

The present invention is defined by the appended claims. Accordingly, among the structural elements described in the following embodiment, structural elements not recited in any one of the independent claims are described as structural elements that are not necessarily essential to solve the technical problem of the present disclosure, but constitute a more preferred embodiment.

Also, numerical values and numerical ranges described in the embodiment are merely exemplary, and thus the present disclosure is not limited to the numerical values and the numerical ranges.

EMBODIMENT

In an embodiment of the present disclosure, a configuration will be described in which an anomaly in a device is detected by changing a threshold value used for anomaly detection based on the operating states of devices provided in a home and the state of residents estimated from information obtained from sensors or devices provided in the home.

1. Details of Embodiment

Here, as an embodiment of the present disclosure, an anomaly detection system according to the present disclosure will be described with reference to the drawings. In the present embodiment, an example will be described in which home IoT devices (an air conditioner, a TV set, and the like), IT devices (a smartphone and a personal computer (hereinafter referred to simply as PC)), and the like are connected to a network (home network 11) installed in a home. However, the devices that are connected to the network are not limited thereto.

Also, in the following description, an example will be described in which IoT devices and IT devices have been installed in a home. However, the installation location is not limited to homes, and IoT devices and IT devices may be installed in a facility where people can come in and out.

1.1 Overall Configuration of Anomaly Detection System

FIG. 1 is a diagram showing an overall configuration of anomaly detection system 1 according to the present embodiment. FIG. 1 is a diagram showing a network configuration of anomaly detection system 1.

As shown in FIG. 1, anomaly detection system 1 includes Internet 10, home network 11, home gateway 20, air conditioner 30, gas water heater 31, electric lock 32, light (lighting device) 33, TV set 40, recorder 41, controller 50, smartphone 60, PC 61, anomaly detection processing device 70, and anomaly monitoring device 80.

Internet 10 is the Internet that is widely used, smartphone 60 is an ordinary smartphone, and PC 61 is an ordinary personal computer.

Home gateway 20, air conditioner 30, gas water heater 31, electric lock 32, light 33, TV set 40, recorder 41, controller 50, smartphone 60, PC 61, and anomaly detection processing device 70 are connected to each other via home network 11. When air conditioner 30, gas water heater 31, electric lock 32, light 33, TV set 40, recorder 41, controller 50, smartphone 60, PC 61, and anomaly detection processing device 70 communicate with Internet 10, they communicate via home gateway 20.

Home gateway 20 is connected to air conditioner 30, gas water heater 31, electric lock 32, light 33, TV set 40, recorder 41, controller 50, smartphone 60, PC 61, and anomaly detection processing device 70, and mediates communication between the connected devices and communication between the connected devices and Internet 10.

Also, home gateway 20 manages information such as IP addresses required for air conditioner 30, gas water heater 31, electric lock 32, light 33, TV set 40, recorder 41, controller 50, smartphone 60, PC 61, and anomaly detection processing device 70 to perform communication, and assigns IP addresses to the devices or transmits information required to perform communication in response to requests from the devices.

Also, home gateway 20 monitors the communication between the connected devices and the communication between the connected devices and Internet 10, and transfers the content of the communications to anomaly detection processing device 70.

The content of the communications transferred to anomaly detection processing device 70 may be in the form of communication packets received by home gateway 20 or a log in which the communication packets are organized.

In the case where home gateway 20 transfers a log, home gateway 20 may itself have a log collecting function, or a log collecting device may be used.

Air conditioner 30, gas water heater 31, electric lock 32, light 33, TV set 40, and recorder 41 are home IoT devices that each receive a device control command and operate by interpreting the content of the received device control command. The device control command may be transmitted from home network 11 or from a terminal (not shown) or a server (not shown) provided on Internet 10 via home gateway 20.

Also, each of the devices connects to Internet 10 via home gateway 20 and performs processing operations such as updating firmware and downloading content as needed. Furthermore, each of the devices transmits, to other devices, the operation state of the device or information (sensor information) detected by a sensor incorporated in the device.

For example, in the case of air conditioner 30, air conditioner 30 transmits, to other devices, the operating state (power-on state or power-off state), the power-saving operation setting (power-saving operation, normal operation, or the like), the operation mode setting (auto mode, cooling mode, heating mode, dehumidification mode, humidification mode, fan mode, or the like), the temperature setpoint values, the sensor information of an incorporated sensor (room temperature, humidity, and outside temperature), the setpoint values such as the airflow direction and the airflow rate, and the like.

In the case of gas water heater 31, gas water heater 31 transmits, to other devices, the operating state (power-on state or power-off state), the water heater combustion state, the hot water supply temperature setpoint value, the temperature retention setpoint value, and the auto operation time setpoint value, other setpoint values, and the like.

In the case of electric lock 32, electric lock 32 transmits, to other devices, the operating state (power-on state or power-off state), the lock setting (locked or unlocked), the door open/close state, the alarm state (normal state, break-open state, door-open state, manually unlocked state, tampered state, or the like), the auto lock mode setting (ON or OFF), other setpoint values, and the like.

In the case of light 33, light 33 transmits, to other devices, the operating state (power-on state or power-off state) and the setpoint values for light adjustment when light 33 has a light adjustment function.

In the case of TV set 40, TV set 40 transmits, to other devices, the operating state (power-on state or power-off state), the viewing CH (channel) number, the audio volume setpoint value, and the like. In the case of recorder 41, recorder 41 transmits, to other devices, the operating state (power-on state or power-off state), the content transfer state (stop state, playing state, transferring state, pause state (playing), pause state (recording), recording state, no media state, or the like), and the like.

There is no particular limitation on the timings at which each information described above is transmitted. The above-described information may be transmitted regularly, when there is a change in the state or the values, or when an inquiry is received from another device.

Controller 50 is a device for controlling the home IoT devices such as air conditioner 30, gas water heater 31, electric lock 32, and light 33, and controls air conditioner 30, gas water heater 31, electric lock 32, and light 33 by transmitting device control commands to these devices. Controller 50 may transmit a device control command in response to an input from the user, or may automatically transmit a device control command based on preset conditions.

Smartphone 60 and PC 61 are IT devices that are connected to Internet 10 via home gateway 20. A server is connected to Internet 10. Home gateway 20, smartphone 60, and PC 61 may interact with the home IoT devices that are connected to home network 11 by performing communication with the server via Internet 10.

Anomaly detection processing device 70 provides an alert notification to anomaly monitoring device 80 on Internet 10 via home gateway 20 when anomaly detection processing device 70 detects a communication anomaly in the communication of the home IoT devices such as air conditioner 30, gas water heater 31, electric lock 32, light 33, TV set 40, and recorder 41, and the IT devices such as smartphone 60 and PC 61. The communication anomaly may be an anomaly in communication volume or an anomaly in the number of communications. Also, anomaly detection processing device 70 may be a server device managed by an SOC (Security Operation Center). The communication volume and the number of communications are, for example, the communication volume and the number of communications of the communication during a predetermined period of time. However, the communication volume may be, for example, the volume per communication.

Anomaly monitoring device 80 collects, based on the alert notification provided from anomaly detection processing device 70, a communication log, packets, and the like required to analyze the alert, and manages them in a centralized manner.

Anomaly monitoring device 80 performs correlation analysis by using the collected logs, packets, and the like to detect an anomaly such as a sign or evidence of a security incident. When an anomaly is detected, anomaly monitoring device 80 provides a notification indicating the occurrence of a device anomaly to the residents or the like.

The analysis performed by anomaly monitoring device 80 is not limited to correlation analysis, and anomaly monitoring device 80 may perform analysis using any other method.

In addition, there is no particular limitation on the method for collecting a communication log used for the analysis performed by anomaly monitoring device 80. The communication log may be acquired from anomaly detection processing device 70 or home gateway 20, or using any other method.

Also, there is no particular limitation on the method for providing a notification indicating the occurrence of an anomaly from anomaly monitoring device 80 to the residents, either. The notification may be provided by transmitting the notification to a smartphone or the like of a resident, by emitting a sound alarm from a sound alarm device installed in the home, or by using any other method.

In the present embodiment, home gateway 20 and anomaly detection processing device 70 are illustrated as separate elements, but home gateway 20 may have the functions of anomaly detection processing device 70.

Also, anomaly detection system 1 includes structural elements such as air conditioner 30, gas water heater 31, electric lock 32, light 33, TV set 40, and recorder 41 as the home IoT devices that receive device control commands, and smartphone 60 and PC 61 as the IT devices that are connected to Internet 10 via home gateway 20. However, the device configuration does not necessarily need to be limited thereto, and anomaly detection system 1 may include devices other than the above-described devices, or may include only a few of the above-described devices.

Furthermore, the home IoT devices may, not only receive device control commands, but also transmit device control commands to other devices, or perform communication other than transmitting device control commands. The home IoT devices are examples of IoT devices installed in a facility.

Also, a configuration has been described in which the IT devices are connected to Internet 10. However, the present embodiment is not limited to this configuration, and the IT devices may perform communication with devices that are provided on home network 11. These devices may perform communication with a terminal or a server that is provided on Internet 10 via Internet 10.

Also, a device that can detect people such as a camera (not shown) or a motion sensor (not shown) may also be connected to home gateway 20. In other words, a device that can detect people such as a camera or a motion sensor may be installed in the home. The camera may be a camera incorporated in electric lock 32, smartphone 60, or PC 61. The motion sensor may be a motion sensor incorporated in air conditioner 30 or light 33. The device that can detect people may be a carbon dioxide sensor, a water usage detection sensor, or the like.

Also, home gateway 20, air conditioner 30, gas water heater 31, electric lock 32, light 33, TV set 40, recorder 41, controller 50, smartphone 60, and PC 61 are provided in the home. Anomaly detection processing device 70 may be provided in the home or outside of the home.

Also, one of air conditioner 30, gas water heater 31, electric lock 32, light 33, TV set 40, recorder 41, controller 50, smartphone 60, or PC 61 is an example of a first device provided in a home (an example of a facility). One of the devices other than the one device is an example of a second device, and another one of the devices other than the one device is an example of a third device. At least one of the second device or the third device may be a device that can detect people such as a camera or a motion sensor. The first device is a device for which the threshold value calculation device calculates the threshold value.

1.2 Overall Configuration of Anomaly Detection Processing Device 70

Figure 2:
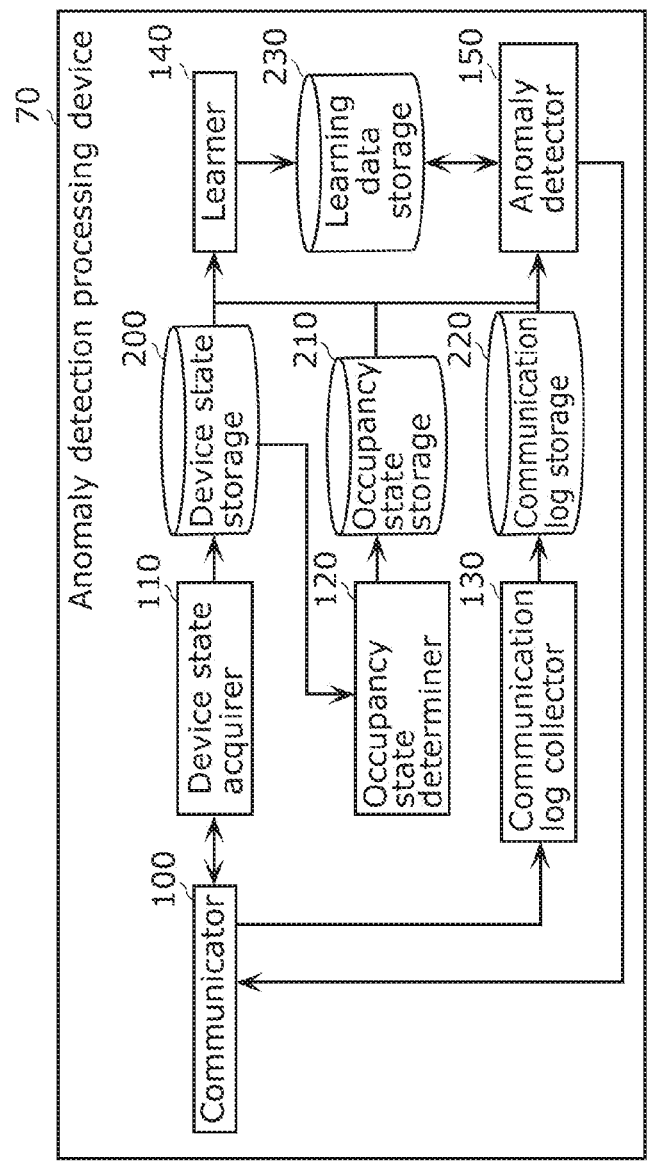
FIG. 2 is a diagram showing a configuration of an anomaly detection processing device according to the embodiment.

FIG. 2 is a diagram showing a configuration of anomaly detection processing device 70 according to the present embodiment. FIG. 2 is a block diagram showing a functional configuration of anomaly detection processing device 70.

As shown in FIG. 2, anomaly detection processing device 70 includes communicator 100, device state acquirer 110, occupancy state determiner 120, communication log collector 130, learner 140, anomaly detector 150, device state storage 200, occupancy state storage 210, communication log storage 220, and learning data storage 230.

In the present embodiment, the threshold value calculation device includes communicator 100, device state acquirer 110 (an example of a first device state acquirer), occupancy state determiner 120 (an example of a first occupancy state determiner), communication log collector 130 (an example of a first communication log collector), learner 140, device state storage 200, occupancy state storage 210, communication log storage 220, and learning data storage 230. Also, in the present embodiment, the anomaly detection device includes communicator 100, device state acquirer 110 (an example of a second device state acquirer), occupancy state determiner 120 (an example of a second occupancy state determiner), communication log collector 130 (an example of a second communication log collector), and anomaly detector 150. Anomaly detection processing device 70 has both the configuration of the threshold value calculation device and the configuration of the anomaly detection device. In the present embodiment, the first device state acquirer, the second device state acquirer, the first occupancy state determiner, the second occupancy state determiner, the first communication log collector, and the second communication log collector are implemented as common structural elements, but the present disclosure is not limited thereto.

The threshold value calculation device is connected to home network 11, and calculates a threshold value used by the anomaly detection device that detects anomalous communication of the first device provided in the home in which home network 11 has been installed. Also, the anomaly detection device is connected to home network 11, and detects anomalous communication of the first device provided in the home in which home network 11 has been installed.

Communicator 100 receives communication packets from Internet 10 or home network 11. Communicator 100 receives not only communication packets addressed to home gateway 20, but also all communication packets transmitted through home network 11 via home gateway 20.

Also, communicator 100 transmits a request for acquiring device state transmitted from device state acquirer 110 to a communication line that is connected to home gateway 20, and transmits a response to the request for acquiring device state received from home gateway 20 via the communication line to device state acquirer 110. Alternatively, communicator 100 may transmit information (device information) and a state (device state) of a device connected to home network 11 actively transmitted from the device connected to home network 11 to device state acquirer 110 via home gateway 20.

Device state acquirer 110 acquires the information and the state of the device connected to home network 11 by transmitting a request for acquiring device state and receiving a response to the request for acquiring device state via communicator 100, and registers the information and the state of the device in device state storage 200. Alternatively, device state acquirer 110 may acquire the device information and the device state actively transmitted from the device connected to home network 11 from home gateway 20 via communicator 100, and register the device information and the device state in device state storage 200. The information registered by device state acquirer 110 may also be referred to as "device state data" (see FIG. 3). As used herein, the term "register" means to store or update information.

The device information of a device refers to information for identifying the device, and includes, for example, at least one of a device identifier or the type of device.

The device state of a device may be estimated from the power or the like used by the device. Also, as the device state, not only the operating state (power-on state or power-off state) of the device, but also the state specific to the device or a combination of a plurality of device states may be registered. Also, the device state may include at least one of a power state or a setpoint value of the first device based on communication that includes a device control command for controlling a plurality of devices including the first device.

Hereinafter, an example of information that may be included in the device state of a device other than the power state (power-on state or power-off state) will be given. The power state of a device may also be referred to as the operating state of the device.

For example, in the case of air conditioner 30, the preset temperature, the operation mode (cooling mode, heating mode, or the like), or the like may be registered. The preset temperature is an example of a setpoint value.

In the case of gas water heater 31, a value such as the hot water supply temperature or the water heater usage (the amount of gas or hot water used) may be registered. The hot water supply temperature is an example of a setpoint value.

In the case of electric lock 32, the lock state (unlocked state or locked state) may be registered. In the case of light 33, the light adjustment state may be registered.

In the case of TV set 40, a value such as the viewing CH number or the audio volume may be registered. In the case of recorder 41, the state such as playing state, recording state, or any other state may be registered.

In the case of smartphone 60 or PC 61, User-Agent, the name of the currently used application, or the like may be registered.

In the case of a motion sensor, information indicating whether a person has been detected may be registered. In the case of a thermo-hygrometer sensor (not shown), a value such as temperature or humidity may be registered.

In the case of a window sensor (not shown) or a door sensor (not shown), information indicating whether the window or the door is open or closed, a numerical value indicating how much the window or the door is open, or the lock state (unlocked state or locked state) may be registered.

Device state storage 200 stores information regarding the device states of the devices connected to home network 11 as device state data. Device state storage 200 is a storage device such as a semiconductor memory.

FIG. 3 is a diagram showing an example of device state data according to the present embodiment. The device state data shown in FIG. 3 is generated by device state acquirer 110.

As shown in FIG. 3, the device state data includes the device identifier and the type of device as information for identifying an individual device, and also includes the device state as information indicating the current device state. The type of device and the device state are registered as a set.

When a device is connected to home network 11 for the first time, the device identifier, the type of device, and the device state of the device are newly registered. After that, the device state is updated to the latest state as appropriate.

As the device identifier, a MAC (Media Access Control) address acquired from each device may be registered, or information other than the MAC address may be used as the identifier.

As the type of device, the device name, the model name, or the OS (Operating System) name estimated from terminal information acquired from each device may be registered, or a combination thereof may be registered.

As the device state, the state of a device such as the operating state (power-on state or power-off state) determined by device state acquirer 110 is registered. In FIG. 3, the device state and the type of device are registered in one-to-one correspondence, but a plurality of device states may be registered for the type of device. The device states may be registered separately in different columns, or the registration item may be changed for each type of device. The device state includes one or more states (for example, power on, power off, unlocked state, and the like) of each of the plurality of devices including the first device.

Referring back to FIG. 2, occupancy state determiner 120 determines the occupancy state indicating whether people are at home based on information acquired from the device connected to home network 11. For example, occupancy state determiner 120 determines the occupancy state indicating whether people are at home by using at least information acquired from the second device that is different from the first device for which the threshold value for anomaly detection is calculated. For example, occupancy state determiner 120 may further determine the occupancy state indicating whether people are at home based on information acquired from at least one of the first device or the third device. Alternatively, occupancy state determiner 120 may acquire the current device state from device state storage 200, determine the occupancy state based on the combination of device states, and generate occupancy state data (see FIG. 4). Occupancy state determiner 120 registers the generated occupancy state data in occupancy state storage 210. The occupancy state data is a table in which the device state and the occupancy state (for example, occupied state or vacant state) are associated with each other. The occupancy state data is generated, for example, before the threshold value calculation device actually calculates the threshold value.

Occupancy state determiner 120 may analyze the device usage of each device or various types of sensor information to determine the occupancy state indicating whether people are at home and generate occupancy state data, and register the generated occupancy state data in occupancy state storage 210.

In the case where occupancy state determiner 120 determines the occupancy state from the device usage of each device, occupancy state determiner 120 estimates the occupancy state from a combination of device usages of devices. For example, in the case where the device state of air conditioner 30 is power-on state, the device state of electric lock 32 is unlocked state, and the device state of TV set 40 is power-on state, occupancy state determiner 120 determines that the occupancy state is "occupied state". Occupancy state determiner 120 may estimate the occupancy state from the device usage by using the table in which combinations of device usages of devices are associated with the occupancy state.

In the case where occupancy state determiner 120 determines the occupancy state from the various types of sensor information, occupancy state determiner 120 may determine the occupancy state from information obtained from a motion sensor installed in the home or information obtained by analyzing images or video captured by a camera installed in the home. Alternatively, occupancy state determiner 120 may determine the occupancy state, by using RF tag transmitters carried by all residents and a receiver such as an RF receiver installed in the home, from information indicating where each transmitter is in the home, information indicating whether each transmitter is operating, and information indicating whether each transmitter is operating by receiving information from a sensor incorporated in the transmitter. Alternatively, occupancy state determiner 120 may determine the occupancy state by using transmitters carried by all residents and a receiver installed in the home and transmitting a signal received by the receiver to controller 50 in the home via a server, home gateway 20 or the like, or may determine the occupancy state from information indicating the whereabouts of residents obtained using an indoor positioning system. Alternatively, occupancy state determiner 120 may determine the occupancy state by estimating the number of users from the communication volume through home gateway 20 and the records of the communication volume in the past, or may determine the occupancy state by estimating the number of users from the number of connections of Wi-Fi (registered trademark) access points (Wi-Fi AP), or any other information.

Alternatively, occupancy state determiner 120 may determine the occupancy state from information based on which it can be determined that people are actually at home or in motion, the information being obtained from sensor information transmitted from home appliances (for example, information from an open/close sensor of a refrigerator, information from an open/close sensor of a window or a door, the water usage in the kitchen or bathroom, room temperature, humidity, carbon dioxide concentration, chemical substance concentration, the amounts of change thereof, and the like).

Occupancy state storage 210 stores information regarding the occupancy state determined from the device state of the second device or a combination of device states of a plurality of devices including the second device as the occupancy state data. Occupancy state storage 210 is a storage device such as a semiconductor memory.

FIG. 4 is a diagram showing an example of occupancy state data according to the present embodiment. The occupancy state data shown in FIG. 4 is generated by occupancy state determiner 120.

As shown in FIG. 4, in the occupancy state data, combinations of device states of all devices registered in the device state data stored in device state storage 200 and the occupancy states corresponding to the combinations of device states are associated with each other and registered. In the occupancy state, the occupancy state indicating whether people are at home (occupied state or vacant state) is registered. That is, the occupancy state includes information indicating whether there are people at home. The occupancy state includes information indicating one or more states of people at home (occupied state, vacant state, or the like).

The occupancy state is not limited to whether people are at home (occupied state or vacant state). In the case of the occupancy state being the occupied state, for example, the number of people at home, the locations of residents, the attributes of residents, or the like may be registered as the occupancy state, or combinations of a plurality of occupancy states may be registered.

For example, as the occupancy state data, information such as the headcount of people at home (one person is at home, two persons are at home, and the like) or the location of people at home (only on the ground floor, only on the second floor, only in the bedroom, only in the living room, in the kitchen, and the like) may be registered. That is, the occupancy state may include at least one of the headcount or the location of people at home. Also, for example, as the occupancy state data, attributes of residents at home (only children are at home, only grandparents are at home, and the like) may be registered, or attributes of people other than the residents such as guests may be registered. The location of people at home includes information regarding which in room the people are, which floor the people are, and the like.

Also, the occupancy state may include human activity information. The activity information may include information indicating whether someone is awake or sleeping, information indicating the amount of human movement, and the like. The activity information can be acquired from a sensor or the like. Also, in the case where it is determined that people are at home, but a monitoring system in the home provided by a home security company is in a monitoring state, occupancy state determiner 120 may determine that someone is sleeping.

Also, in FIG. 4, the occupancy state is registered in one column, but may be registered separately in a plurality of columns based on different registration items as described above.

FIG. 4 is merely exemplary. Whether people are at home can be actually determined based on combinations of information indicating whether people are at home that have been registered in advance, or can be automatically determined based on results obtained by learning on the records of usage in the past. Alternatively, the occupancy state may be registered by a resident before anomaly detection system 1 is used.

The occupancy state data shown in FIG. 4 is generated in, for example, each home. For example, the occupancy state data varies from home to home.

In FIG. 4, a sign such as "–" may be used to indicate that the device state or the occupancy state is any state.

Referring back to FIG. 2, communication log collector 130 registers the communication packets received by communicator 100 in communication log storage 220 as a communication log. Communication log collector 130 collects, for example, communication logs generated based on communications transmitted and received by the plurality of devices including the first device.

Communication log storage 220 stores information regarding communications of the devices connected to home network 11 as communication data. Communication log storage 220 is a storage device such as a semiconductor memory.

FIG. 5 is a diagram showing an example of a communication log according to the present embodiment. The communication data shown in FIG. 5 is generated by communication log collector 130.

As shown in FIG. 5, in the communication log, registration items such as communication date and time, transmission source identifier, transmission destination identifier, communication protocol, communication volume, and type of online communication that are included in the communication packets are registered. The communication log is time-series data during a predetermined period of time.

As the communication date and time, the date and time at which a communication is generated is registered. The granularity in time is not limited to seconds, and may be milliseconds or microseconds.

As the transmission source identifier, the MAC address of each of the devices connected to home network 11 is registered.

Information other than the MAC address may be used as the transmission source identifier.

As the transmission destination identifier, a fully qualified domain name (FQDN) or a domain name that is an identifier of a transmission destination to which the transmission source device connected to home network 11 performs communication is registered. As the transmission destination identifier, either a MAC address or an IP address may be used, or a combination thereof may be used.

As the communication protocol, a protocol used in the communication is registered. Communication log collector 130 may determine the communication protocol used in the communication from the data portion of the communication packets, or may estimate the communication protocol used in the communication from a transmission destination port number.

For example, according to ECHONET Lite, 0x1081 or 0x1082 is set in the first 2 bytes of the communication data. For this reason, in the case where 0x1081 or 0x1082 is set in the first 2 bytes of the data portion of the communication packets, communication log collector 130 determines that the communication protocol is ECHONET Lite.

Alternatively, for example, according to ECHONET Lite, a UDP (User Datagram Protocol) port with a port number of 3610 is used to perform communication. For this reason, in the case where the transmission destination port number of the received communication is 3610, communication log collector 130 determines that the communication protocol is ECHONET Lite.

Alternatively, communication log collector 130 may determine the communication protocol based on the combination of the above-described information, or based on any other information.

As the communication volume, the packet size of communication packets is registered.

As the type of online communication, the type of online communication (local communication or global communication) is registered. In the case where the transmission destination identifier indicates a device connected to home network 11, communication log collector 130 determines that the type of online communication is local communication. Alternatively, in the case where the transmission destination identifier indicates a server (not shown), a site (not shown), or the like provided on Internet 10, communication log collector 130 determines that the type of online communication is global communication. Then, communication log collector 130 registers the determined result.

In the manner described above, in the communication log, type information indicating the type of online communication determined based on the transmission destination identifier of the communication log. The type information may include one or more types of online communication in the communication log.

The communication log may be transferred to communication log collector 130 in the case where home gateway 20 or any other device (not shown) has a communication log generation function.

Referring back to FIG. 2, learner 140 calculates a threshold value for communication performed by each of the plurality of devices including the first device (for example, a threshold value for the communication volume) based on the device state, the occupancy state, and the communication log. Learner 140 calculates a threshold value corresponding to the device state and the occupancy state during a second period including the time at which the communication log for which the anomaly detection device performs detection was acquired. Learner 140 may calculate the threshold value, for example, for each of the combinations of the device state (for example, one or more device states) and the occupancy state (for example, one or more occupancy states). Alternatively, learner 140 may calculate the threshold value for each of the combinations of one or more types of online communication. That is, learner 140 may calculate the threshold value for each of the combinations of the device state (for example, one or more device states), the occupancy state (for example, one or more occupancy states), and the one or more types of online communication.

Learner 140 generates learning data and threshold value data based on the device state data acquired from device state storage 200, the occupancy state data acquired from occupancy state storage 210, and the communication log acquired from communication log storage 220, and registers the learning data and the threshold value data in learning data storage 230. Learner 140 is an example of a calculator.

Learning data storage 230 stores the content of the communication including the device state and the occupancy state as learning data. Also, learning data storage 230 stores the threshold value calculated from the learning data as the threshold value data. The learning data is empirical data for performing threshold value calculation.

FIG. 6 is a diagram showing an example of learning data according to the present embodiment. The learning data shown in FIG. 6 is generated by learner 140.

As shown in FIG. 6, in the learning data, registration items such as communication date and time, device identifier, device state, occupancy state, communication volume, and type of online communication are registered.

As the device identifier and the device state, the device identifier and the device state registered in the device state data stored in device state storage 200 are registered.

As the occupancy state, the occupancy state registered in the occupancy state data stored in occupancy state storage 210 is registered.

As the communication date and time, the type of online communication, and the communication volume, the communication date and time, the type of online communication, and the communication volume registered in the communication data stored in communication log storage 220 are registered.

As shown in FIG. 6, learner 140 generates learning data associated with the device state, the occupancy state, and the communication log (the communication volume and the type of online communication in the example shown in FIG. 6). The generated learning data is, for example, time-series data in which the device state data, the occupancy state data, and the communication log data are organized in time series. As will be described later, learner 140 performs threshold value calculation based on the learning data.

Learner 140 may generate learning data as shown in FIG. 6 for each of the plurality of devices including the first device.

FIG. 7 is a diagram showing an example of threshold value data according to the present embodiment. The threshold value data shown in FIG. 7 is generated by learner 140.

As shown in FIG. 7, in the threshold value data, registration items such as device identifier, device state, occupancy state, type of online communication, and threshold value are registered.

As the device identifier and the device state, the device identifier and the device state registered in the device state data stored in device state storage 200 are registered.

As the occupancy state, the occupancy state registered in the occupancy state data stored in occupancy state storage 210 is registered.

As the communication date and time, the type of online communication, and the communication volume, the communication date and time, the type of online communication, and the communication volume registered in the communication data stored in communication log storage 220 are registered.

As the threshold value, a minimum value and a maximum value of the packet size calculated by learner 140 based on the communication volume stored in communication log storage 220 are registered as the threshold value. However, the threshold value does not necessarily need to include the minimum value and the maximum value of the packet size. The average value of the packet size, the number of accesses per unit time, or any other information may be registered as the threshold value, or a combination thereof may be registered. Depending on the number of threshold values registered, the number of columns in the threshold value data may be increased. The calculation of the threshold value will be described later.

The threshold value is a threshold value for the communication volume, and may include a maximum value and a minimum value of the communication volume. Alternatively, the threshold value may be a threshold value for the number of communications, and may include a maximum value and a minimum value of the number of communications. Here, it is sufficient that the threshold value includes at least one of a maximum value or a minimum value.

As shown in FIG. 7, learner 140 generates threshold value data in which the device state, the occupancy state, the type of online communication, and the threshold value for the communication volume at that time are associated with one another. The generated threshold value data is, for example, data in which the threshold value is associated with each of the combinations of the device state, the occupancy state, and the type of online communication. As will be described later, anomaly detector 150 detects a device anomaly based on the threshold value data generated by learner 140.

Learner 140 may generate threshold value data as shown in FIG. 7 for each of the plurality of devices including the first device.

Referring back to FIG. 2, anomaly detector 150 compares the threshold value data stored in learning data storage 230 with the communication log stored in communication log storage 220 to detect an anomaly. Anomaly detector 150 provides a notification to anomaly monitoring device 80 via communicator 100 when anomalous communication is detected.

1.3 Operations of Anomaly Detection System

Figure 8A:
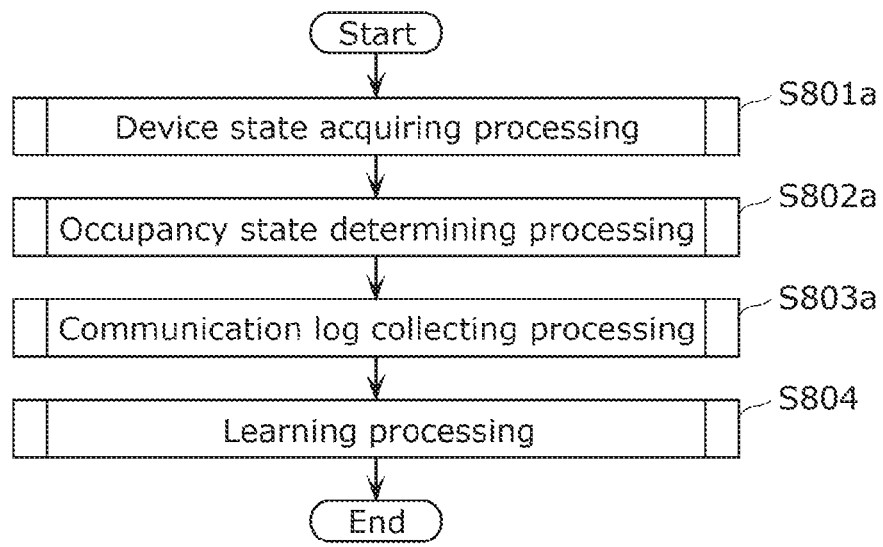
FIG. 8A is a flowchart illustrating operations performed by a threshold value calculation device according to the embodiment.

Hereinafter, the operations of anomaly detection system 1 described above will be described with reference to FIGS. 8A to 18. First, the operations of the threshold value calculation device (threshold value calculation method) will be described with reference to FIGS. 8A to 17. FIG. 8A is a flowchart illustrating the operations (threshold value calculation processing) of the threshold value calculation device. The threshold value calculation processing may also be referred to as "learning processing".

(S801*a*) Anomaly detection processing device 70 performs device state acquiring processing. In step S801*a*, the threshold value calculation device of anomaly detection processing device 70 acquires the device state of each of the plurality of devices including the first device during a first period so as to determine the threshold value. The first period is a period prior to the time at which the communication log for which the anomaly detection device performs anomaly detection was acquired.

(S802*a*) Anomaly detection processing device 70 performs occupancy state determining processing. In step S802*a*, the threshold value calculation device of anomaly detection processing device 70 performs processing for determining the occupancy state during the first period based on information acquired from the second device.

(S803*a*) Anomaly detection processing device 70 performs communication log collecting processing. In step S803*a*, the threshold value calculation device of anomaly detection processing device 70 performs processing for collecting the communication log during the first period.

(S804) Anomaly detection processing device 70 performs learning processing. In step S804, the threshold value calculation device of anomaly detection processing device 70 performs processing for calculating the threshold value for communication performed by each of the plurality of devices including the first device during a second period that is a period after the first period.

Figure 8B:
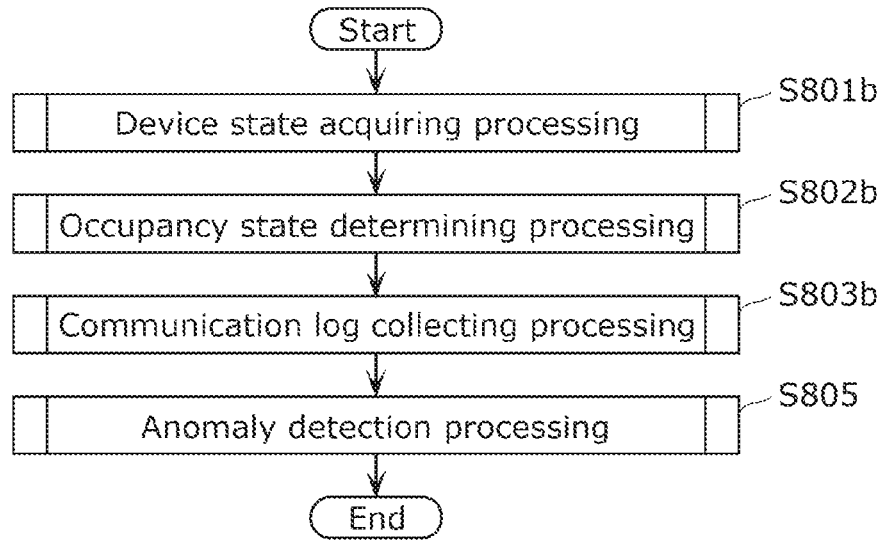
FIG. 8B is a flowchart illustrating operations performed by an anomaly detection device according to the embodiment.

Next, the operations of the anomaly detection device will be described with reference to FIG. 8B. FIG. 8B is a flowchart illustrating the operations (anomaly detection processing) of the anomaly detection device.

(S801*b*) In step S801*b*, the anomaly detection device of anomaly detection processing device 70 performs processing for acquiring the device state of each of the plurality of devices including the first device during a second period that is a period after the first period so as to detect a communication anomaly. The second period is, for example, a period after the first period, but at least a portion of the second period may be included in the first period. The second period may be the time at which the communication log for which detection is performed was acquired (for example, the current time), or a period such as one hour or one day.

(S802*b*) Anomaly detection processing device 70 performs occupancy state determining processing. In step S802*b*, the anomaly detection device of anomaly detection processing device 70 performs processing for determining the occupancy state during the second period based on information acquired from the second device.

(S803*b*) Anomaly detection processing device 70 performs communication log collecting processing. In step S803*b*, the anomaly detection device of anomaly detection processing device 70 performs processing for collecting the communication log during the second period.

(S805) Anomaly detection processing device 70 performs anomaly detection processing. The anomaly detection device of anomaly detection processing device 70 detects the communication anomaly in the communication performed by each of the plurality of devices including the first device during the second period based on the threshold value calculated by the threshold value calculation device, as well as the device state, the occupancy state, and the communication log during the second period.

The communication log collecting processing may be performed prior to the device state acquiring processing or prior to the occupancy state determining processing. Also, the learning processing and the anomaly detection processing may be performed in parallel.

Hereinafter, the learning processing and the anomaly detection processing will be individually described with reference to FIGS. 9 to 18.

1.3.1 Operations of Device State Acquiring Processing

Figure 9:
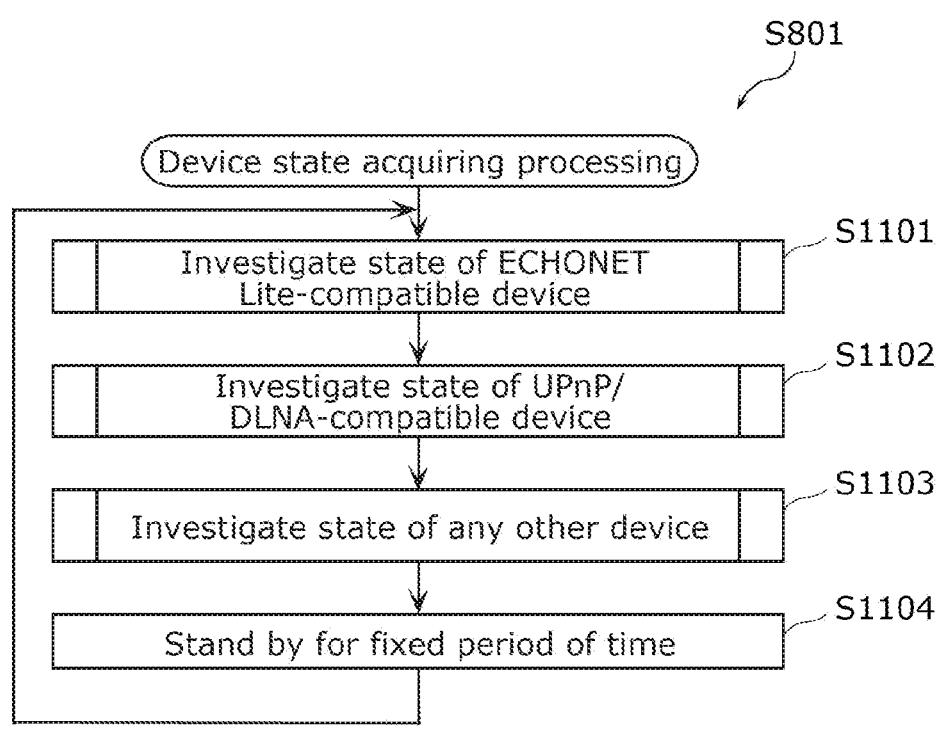
FIG. 9 is a flowchart illustrating an example of device state acquiring processing according to the embodiment.

FIG. 9 is a flowchart illustrating an example of the device state acquiring processing (S801 (S801*a*, S801*b*)) according to the present embodiment. FIG. 9 shows processing operations performed by device state acquirer 110.

(S1101) Device state acquirer 110 investigates the state of an ECHONET Lite-compatible device connected to home network 11, and updates the device state data.

(S1102) Device state acquirer 110 investigates the state of an UPnP/DLNA-compatible device connected to home network 11, and updates the device state data.

(S1103) Device state acquirer 110 investigates the states of other devices connected to home network 11, and updates the device state data.

(S1104) Device state acquirer 110 stands by for a fixed period of time, again returns to step S1101, and continues the processing operations from step S1101.

In FIG. 9, device state acquirer 110 sequentially performs the processing operations from step S1101 to step S1103, but the processing operations may not necessarily need to be performed in the order shown in FIG. 9. Also, device state acquirer 110 may perform the processing operations in parallel. Also, device state acquirer 110 does not necessarily need to perform all of the processing operations from step S1101 to step S1103 each time. It is sufficient that device state acquirer 110 performs at least one of steps S1101 to S1103 in the device state acquiring processing. In the case where each device actively transmits a state notification on a regular basis, device state acquirer 110 may perform the processing at the timing at which the notification is received.

Hereinafter, steps S1101 to S1103 will be individually described with reference to FIGS. 10 to 12.

1.3.1.1 ECHONET Lite-Compatible Device State Investigation Processing

Figure 10:
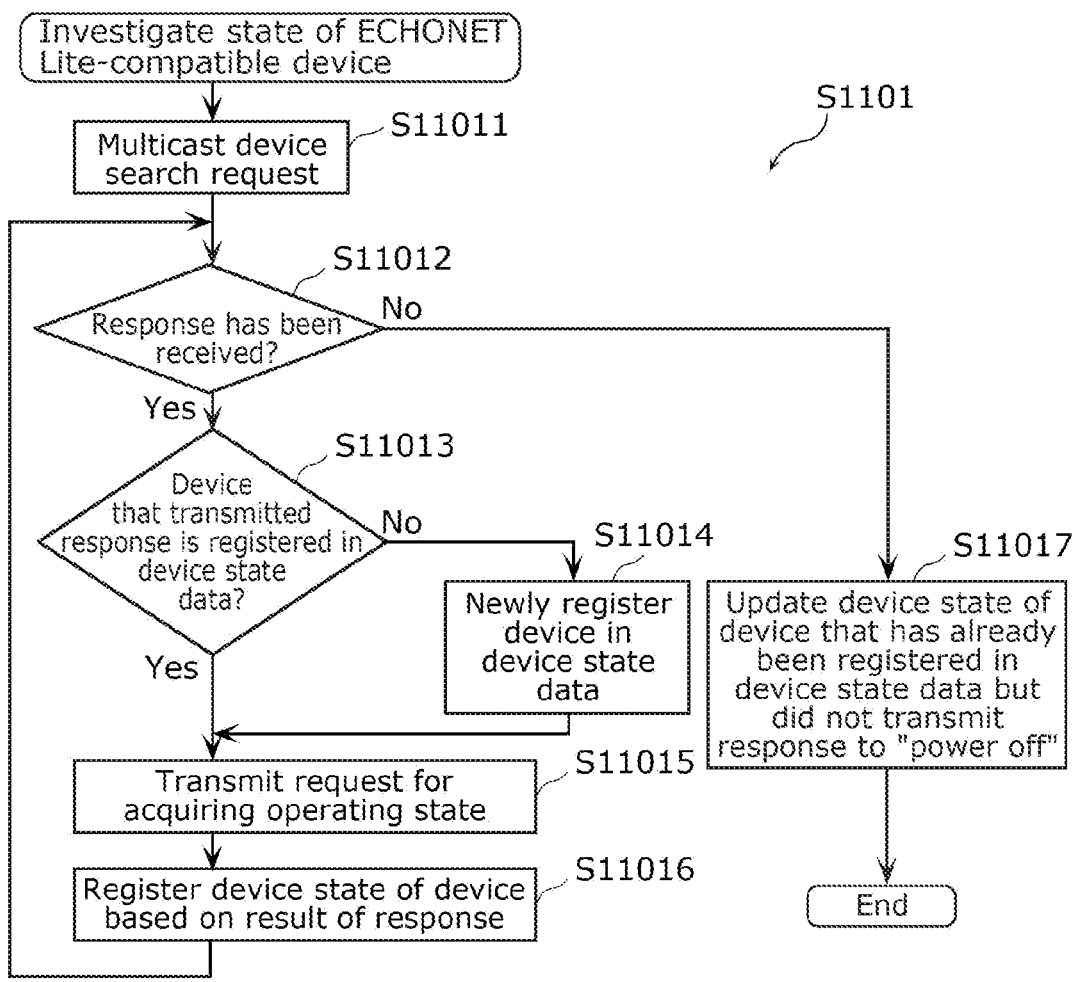
FIG. 10 is a flowchart illustrating an example of device state acquiring processing according to the embodiment.

FIG. 10 is a flowchart illustrating an example of the device state acquiring processing according to the present embodiment.

Specifically, FIG. 10 is a flowchart illustrating an example of processing for investigating the device state of an ECHONET Lite-compatible device (S1101).

(S11011) Device state acquirer 110 multicasts an own node instance list request (0xD6) to home network 11 as a device search request, the own node instance list request (0xD6) being a control command for controlling the ECHONET Lite-compatible device.

(S11012) Device state acquirer 110 determines whether a response to the own node instance list request (0xD6) has been received. If it is determined that a response has been received (Yes in S11012), device state acquirer 110 performs the processing of step S11013. If it is determined that a response has not been received (No in S11012), device state acquirer 110 performs the processing of step S11017.

(S11013) Device state acquirer 110 determines whether the device that transmitted the response is registered in the device state data, for example, whether the device that transmitted the response is an unregistered device. Specifically, device state acquirer 110 determines whether a connection terminal device identifier such as a transmission source MAC address included in the response indicates a device that is registered in device state storage 200. If it is determined that the device is not registered (No in S11013), device state acquirer 110 performs the processing of step S11014. If it is determined that the device is registered (Yes in S11013), device state acquirer 110 performs step S11015.

(S11014) Device state acquirer 110 newly registers the connection terminal device identifier (a transmission source MAC address or the like) and the type of device of the target device in device state storage 200. The type of device is determined based on the ECHONET (registered trademark) object code (EOJ). For example, in the case where the class group code is 0x01 (air conditioner-related device class group) or the class code is 0x30 (home air conditioner class), the type of device can be identified as air conditioner. Alternatively, device state acquirer 110 may identify the type of device by analyzing the communication packets, or may estimate the type of device from an OUI (Organizationally Unique Identifier) included in the MAC address.

(S11015) Device state acquirer 110 transmits a request for acquiring operating state using a control command for controlling the ECHONET Lite-compatible device to the target device.

The control command includes a property value read-out request (ESV (ECHONET Lite service): 0x62) for acquiring the operating state (EPC (ECHONET property): 0x80) of the power supply of the device, a state request unique to the type of device, or a combination of these requests. In the case where the device is a home air conditioner, device state acquirer 110 transmits, as a request for acquiring operating state, a property value read-out request (ESV: 0x62) for acquiring operation mode settings (EPC: 0xB0). In the case where the device is a water heater, device state acquirer 110 transmits, as a request for acquiring operating state, a property value read-out request (ESV: 0x62) for acquiring hot water supply temperature settings (EPC: 0xD1).

(S11016) Device state acquirer 110 receives the result of response to the control command transmitted in step S11015, identifies the device state based on the received result of response, and registers the identified device state in the device state data.

When the result of response to the property value read-out request (ESV: 0x62) for acquiring the operating state (EPC: 0x80) of the power supply of the device indicates power on (EDT (ECHONET property value data): 0x30) or power off (EDT: 0x31), device state acquirer 110 registers "power on" or "power off" in the device state data as the device state. Device state acquirer 110 may register the device state by using "power on" or "power off" in the form of a character string, or the property value "EDT: 0x30" or "EDT: 0x31".

Also, for example, in the case where the device is a water heater, if the result of response to the property value read-out request for acquiring the operating state (EPC: 0x80) of the power supply of the device indicates, for example, power on (EDT: 0x30), and the result of response to the property value read-out request for acquiring hot water supply temperature settings (EPC: 0xD1) indicates, for example, a preset temperature of 48° C. (EDT: 0x30), device state acquirer 110 registers, for example, a combination of EPC and EDT such as, for example, "0x80/0x30" or "EPC: 0xD1/0x30" as the result of response from the water heater.

(S11017) Device state acquirer 110 may update the device state by setting "power off" as the device state of a device that has already been registered in the device state data, but did not transmit a response, or in other words, a device that was once connected to home network 11, but is not currently connected to home network 11. Device state acquirer 110 may update the device state by setting "not connected", instead of setting "power off".

1.3.1.2 UPnP/DLNA-Compatible Device State Investigation Processing

Figure 11:
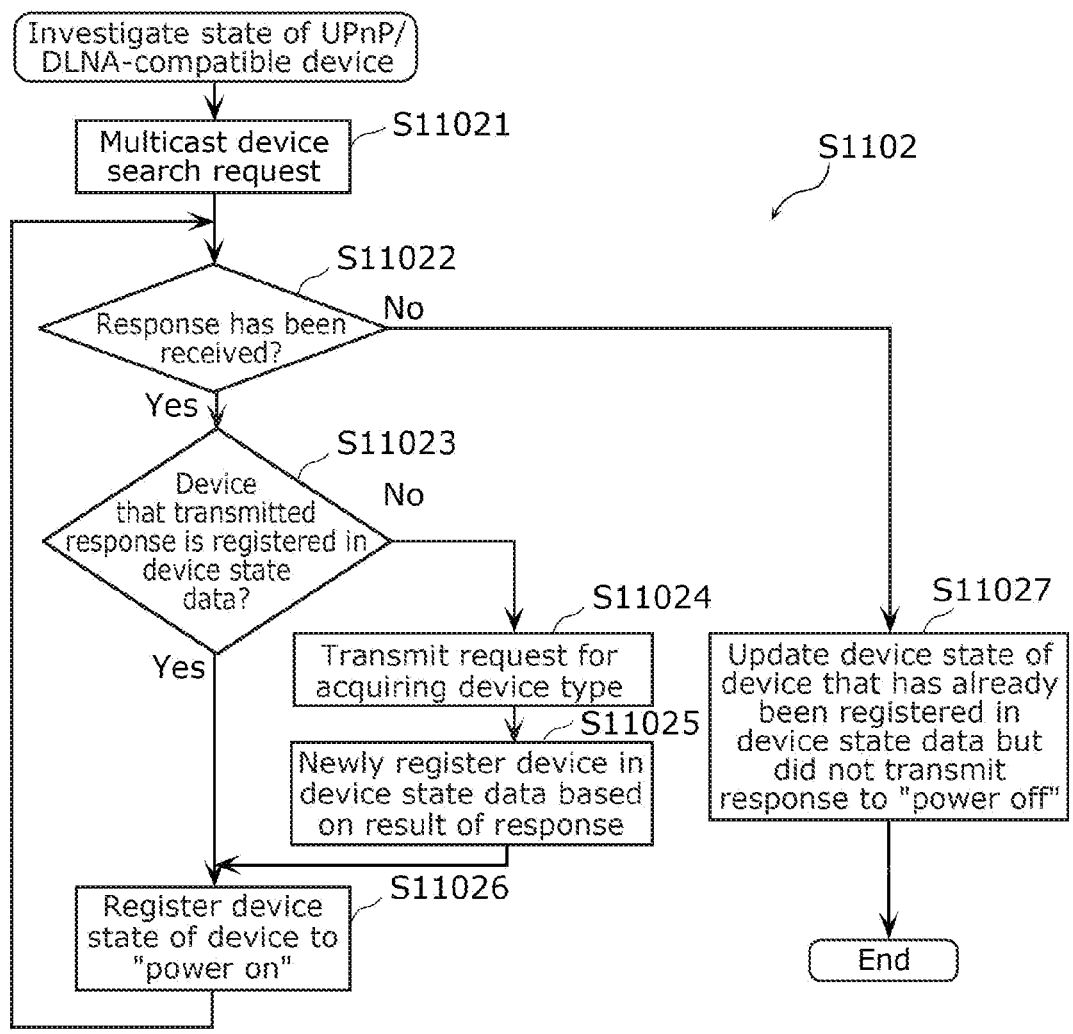
FIG. 11 is a flowchart illustrating another example of device state acquiring processing according to the embodiment.

FIG. 11 is a flowchart illustrating another example of the device state acquiring processing according to the present embodiment. Specifically, FIG. 11 is a flowchart illustrating an example of processing for investigating the device state of an UPnP/DLNA-compatible device (S1102).

(S11021) Device state acquirer 110 multicasts an M-SEARCH request to home network 11 as a device search request, the M-SEARCH request being a control command for controlling the UPnP/DLNA-compatible device.

(S11022) Device state acquirer 110 determines whether a response to the M-SEARCH request has been received. If it is determined that a response has been received (Yes in S11022), device state acquirer 110 performs the processing of step S11023. If it is determined that a response has not been received (No in S11022), device state acquirer 110 performs the processing of step S11027.

(S11023) Device state acquirer 110 determines whether the device that transmitted the response is registered in the device state data, for example, whether the device that transmitted the response is an unregistered device. Specifically, device state acquirer 110 determines whether a connection terminal device identifier such as a transmission source MAC address included in the response indicates a device that is registered in device state storage 200. If it is determined that the device is not registered (No in S11023), device state acquirer 110 performs step S11024. If it is determined that the device is registered (Yes in S11023), device state acquirer 110 performs step S11026.

(S11024) Device state acquirer 110 transmits a request for acquiring device type (for example, an HTTP GET request or the like) to the target device.

(S11025) Device state acquirer 110 acquires a result of response (Device Description XML) to the request for acquiring device type, and newly registers the unregistered device in the device state data based on the result of response acquired. Specifically, device state acquirer 110 estimates the type of device from parameters that are included in the result of response such as "model Name", "model Number", and "model Description", and newly registers the connection terminal device identifier (a transmission source MAC address or the like) and the type of device included in the result of response in the device state data (device state storage 200). The parameters are merely exemplary, and device state acquirer 110 may estimate the type of device from other parameters. Alternatively, device state acquirer 110 may identify the type of device by analyzing the communication packets, or may estimate the type of device from an OUI included in the MAC address.

(S11026) Because a response has been received, device state acquirer 110 registers "power on" in the device state data as the device state of the target device. The device state may be set based on a result of response to a state request unique to the type of device.

(S11027) Device state acquirer 110 may update the device state by setting "power off" as the device state of a device that has already been registered in the device state data, but did not transmit a response, or in other words, a device that was once connected to home network 11, but is not currently connected to home network 11. Device state acquirer 110 may update the device state by setting "not connected", instead of setting "power off".

1.3.1.3 Processing for Investigating Device State of Other Device

Figure 12:
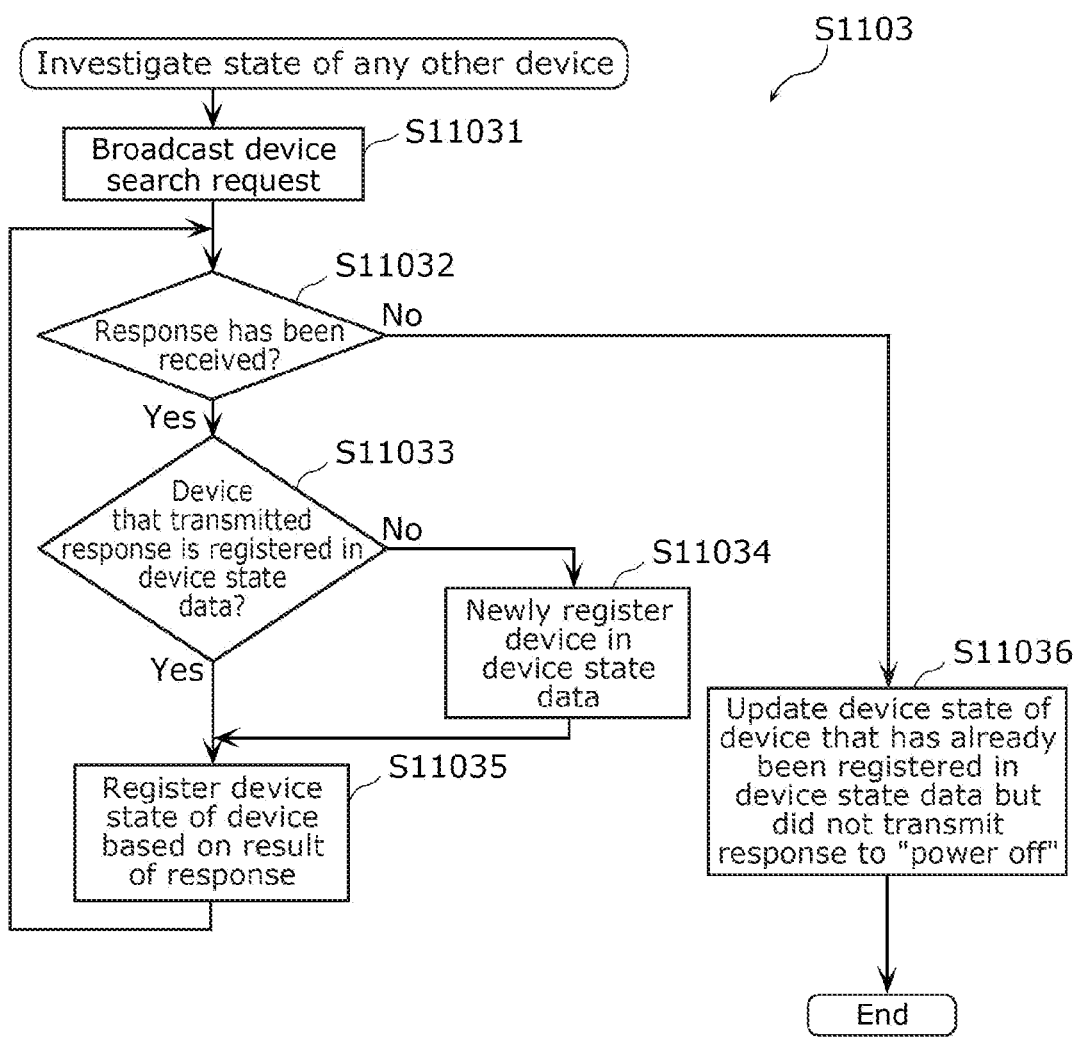
FIG. 12 is a flowchart illustrating yet another example of device state acquiring processing according to the embodiment.

FIG. 12 is a flowchart illustrating yet another example of the device state acquiring processing according to the present embodiment. FIG. 12 is a flowchart illustrating an example of processing for investigating the device state of a device (smartphone 60, PC 61, or the like) other than the ECHONET Lite-compatible device and the UPnP/DLNA-compatible device (S1103).

(S11031) Device state acquirer 110 broadcasts an ARP (Address Resolution Protocol) request to home network 11 as a device search request.

(S11032) Device state acquirer 110 determines whether a response to the ARP request has been received. If it is determined that a response has been received (Yes in S11032), device state acquirer 110 performs the processing of step S11033. If it is determined that a response has not been received (No in S11032), device state acquirer 110 performs the processing of step S11036.

(S11033) Device state acquirer 110 determines whether the device that transmitted the response is registered in the device state data, for example, whether the device that transmitted the response is an unregistered device. Specifically, device state acquirer 110 determines whether a connection terminal device identifier such as a transmission source MAC address included in the response indicates a device that is registered in device state storage 200. If it is determined that the device is not registered (No in S11033), device state acquirer 110 performs step S11034. If it is determined that the device is registered (Yes in S11033), device state acquirer 110 performs step S11035.

(S11034) Device state acquirer 110 newly registers the connection terminal device identifier (a transmission source MAC address or the like) and the type of device of the target device in the device state data (device state storage 200). Device state acquirer 110 may identify the type of device by analyzing the communication packets transmitted from the device, or may estimate the type of device from an OUI included in the MAC address. For example, the name or version of the OS may be determined by analyzing the User-Agent included in the communication packets.

(S11035) Device state acquirer 110 registers the device state based on the result of response of the target device. Device state acquirer 110 registers, for example, "power on" in the device state data as the device state of the target device. Device state acquirer 110 may set "power on" for a device that transmitted a response, or may set an application or the like used by the device by analyzing the communication packets transmitted form the device. Device state acquirer 110 can determine, for example, the currently used browser or the like by analyzing the User-Agent included in the communication packets.

(S11036) Device state acquirer 110 may update the device state by setting "power off" as the device state of a device that has already been registered in the device state data, but did not transmit a response, or in other words, a device that was once connected to home network 11, but is not currently connected to home network 11. Device state acquirer 110 may update the device state by setting "not connected", instead of setting "power off".

1.3.2 Operations of Occupancy State Determining Processing

Figure 13:
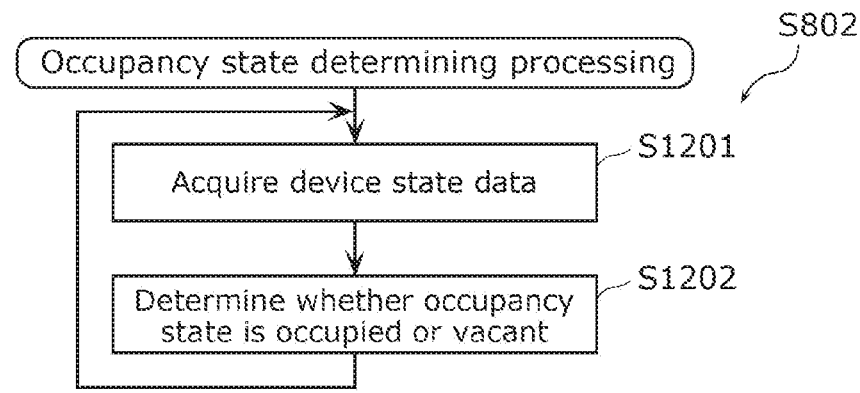
FIG. 13 is a flowchart illustrating an example of occupancy state determining processing according to the embodiment.

FIG. 13 is a flowchart illustrating an example of the occupancy state determining processing (S802 (S802a and S802b)) according to the present embodiment. FIG. 13 shows processing operations performed by occupancy state determiner 120.

(S1201) Occupancy state determiner 120 acquires the current device states of all devices registered in the device state data stored in device state storage 200.

(S1202) Occupancy state determiner 120 compares the state indicated by the device state data stored in device state storage 200 with the combinations of device states registered in the occupancy state data stored in occupancy state storage 210, and determines whether the occupancy state is occupied or vacant, or in other words, whether people are at home or not. For example, in the case where the device state data stored in device state storage 200 is as shown in FIG. 3 (air conditioner 30 is set to "power on", electric lock 32 is set to "unlocked", TV set 40 is set to "power off", and smartphone 60 is set to "power on"), in the occupancy state data stored in occupancy state storage 210 shown in FIG. 4, a combination of device states that corresponds to this combination indicates "occupied", and thus the occupancy state is determined as "occupied". Alternatively, occupancy state determiner 120 may estimate and register the occupancy state of the occupancy state data from the combinations of device states, or may set whether residents are at home or not. Occupancy state determiner 120 does not necessarily need to determine whether people are at home based on the device state, and may determine whether people are at home by using various types of sensor information such as information obtained from a motion sensor, by using the amount of water, electricity, gas or the like used, or by using information regarding the type of online communication in addition to the device state.

1.3.3 Operations of Communication Log Collecting Processing

Figure 14:
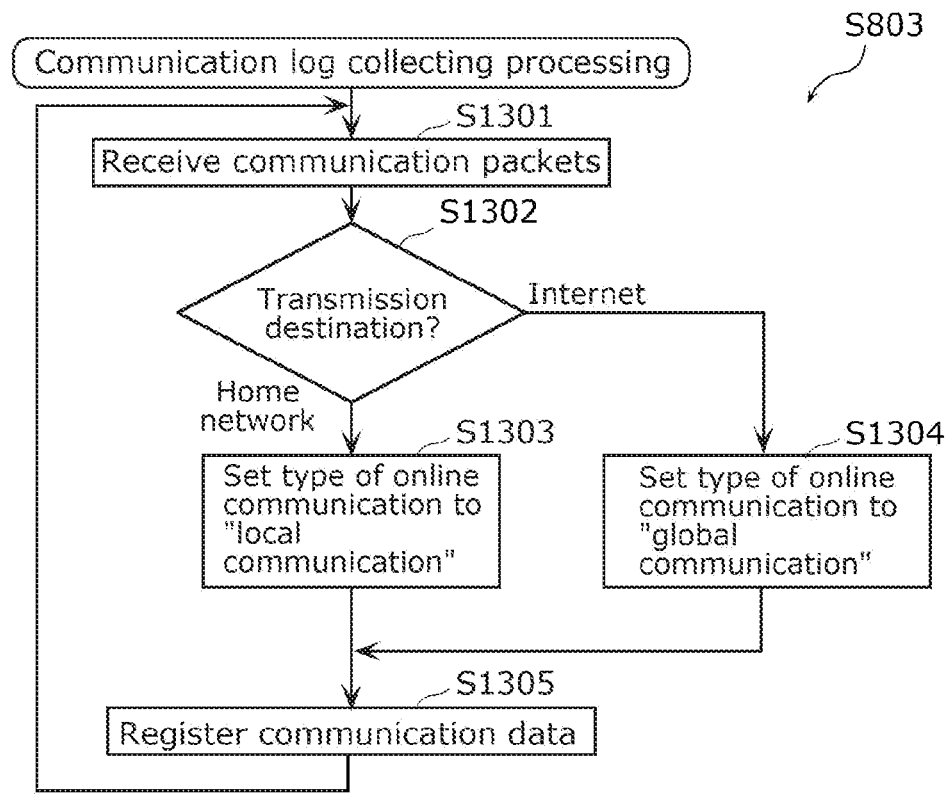
FIG. 14 is a flowchart illustrating an example of communication log collecting processing according to the embodiment.

FIG. 14 is a flowchart illustrating an example of the communication log collecting processing (S803 (S803a and S803b)) according to the present embodiment. FIG. 14 shows processing operations performed by communication log collector 130.

(S1301) Communication log collector 130 receives, via communicator 100, the content of communication packets that are transmitted through a communication line that is connected to home gateway 20.

(S1302) Communication log collector 130 determines the transmission destination of the received communication packets. When the transmission destination identifier (an FQDN, a domain name, a MAC address, an IP address, or the like) of the received communication packets indicates the address of a device connected to home network 11, communication log collector 130 performs step S1303. In the case where the transmission destination identifier indicates a server, a site, or the like on Internet 10, communication log collector 130 performs step S1304.

(S1303) In the case where the transmission destination identifier indicates a device connected to home network 11, communication log collector 130 sets the type of online communication of the received communication packets to "local communication".

(S1304) In the case where the transmission destination identifier indicates a server, a site, or the like on Internet 10, communication log collector 130 sets the type of online communication of the received communication packets to "global communication".

(S1305) Communication log collector 130 registers the date and time at which the communication was generated from the received communication packets, the transmission source identifier (a MAC address, an IP address, or the like), the transmission destination identifier, the communication protocol, the type of online communication, and the communication volume in communication log storage 220 as a communication log.

1.3.4 Operations of Learning Processing

Figure 15:
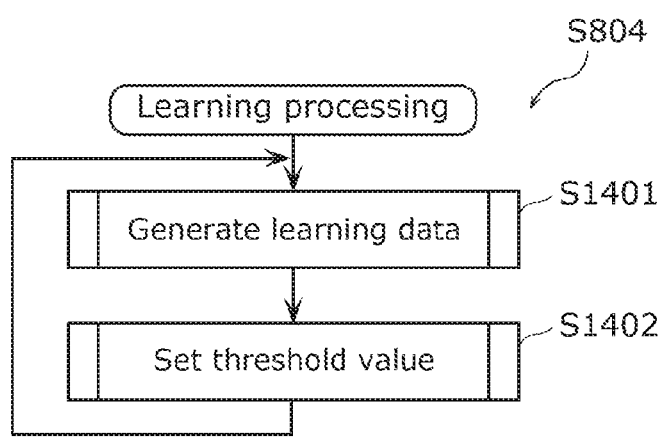
FIG. 15 is a flowchart illustrating an example of learning processing according to the embodiment.

FIG. 15 is a flowchart illustrating an example of the learning processing (S804) according to the present embodiment. FIG. 15 shows processing operations performed by learner 140. The processing shown in FIG. 15 is performed on, for example, each of the plurality of devices including the first device.

(S1401) Learner 140 generates learning data that is data used for threshold value calculation.

(S1402) Learner 140 sets the threshold value based on the generated learning data.

In FIG. 15, learner 140 sequentially performs step S1401 and step S1402, but these processing operations may be performed in parallel.

Hereinafter, the processing operations performed in steps S1401 and S1402 will be individually described with reference to FIGS. 16 and 17.

1.3.4.1 Details of Learning Data Generation Processing

Figure 16:
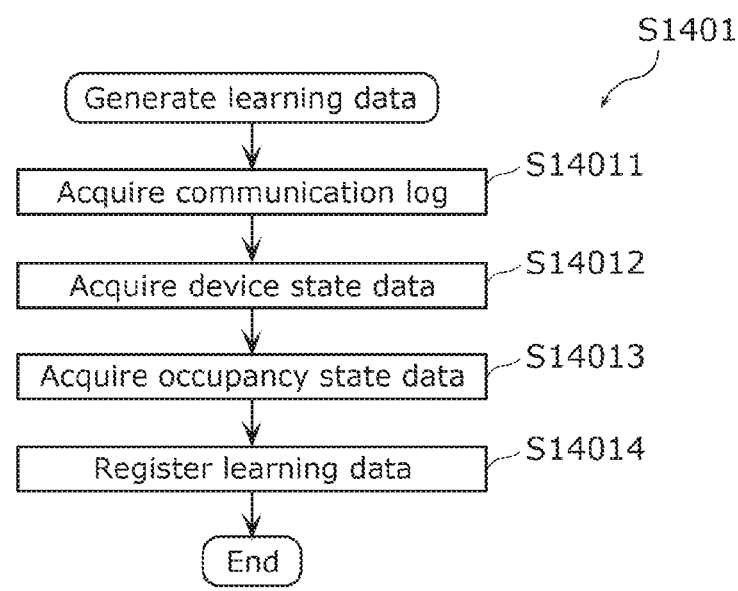
FIG. 16 is a flowchart illustrating an example of learning data generation processing according to the embodiment.

FIG. 16 is a flowchart illustrating an example of the learning data generation processing (S1401) according to the present embodiment.

(S14011) Learner 140 acquires the communication log stored in communication log storage 220. Specifically, learner 140 acquires the transmission source identifier, the communication volume, and the type of online communication of the currently performed communication from the communication log stored in communication log storage 220. Learner 140 is configured to acquire the current communication log, but may be configured to acquire the communication log at a designated time or the communication log of a specific device, or a list of communication logs. When learner 140 acquires a list of communication logs, learner 140 repeatedly performs the processing operations in steps S14012 to S14014.

(S14012) Learner 140 acquires the device state data stored in device state storage 200. Specifically, learner 140 acquires all data of the type of device and the device state of the device state data stored in device state storage 200. It is also possible to add date and time information to the device state data such that learner 140 can acquire the device state at a designated date and time.

(S14013) Learner 140 acquires the occupancy state data stored in occupancy state storage 210. Specifically, learner 140 acquires the occupancy state from the occupancy state data stored in occupancy state storage 210 based on the device state data acquired in step S14012. In the case where, for example, the device state data acquired in step S14012 indicates data in which the air conditioner is set to "power on", the electric lock is set to "unlocked", and the TV set is set to "power off", learner 140 can acquire "occupied" as the occupancy state. It is also possible to add date and time information to the occupancy state data such that learner 140 can acquire the occupancy state at a designated date and time.

(S14014) Learner 140 associates the transmission source identifier, the communication volume, and the type of online communication that were acquired in step S14011, the type of device and the device state that was acquired in step S14012, and the occupancy state that was acquired in step S14013 with one another, and registers them in learning data storage 230 as learning data. In the case of, for example, registering learning data from the communication log at the time "2020/11/4 16:45:00", learner 140 acquires the transmission source identifier indicating "11:11:11:11:11:11", the communication volume indicating "15,000 byte", and the type of online communication indicating "global communication" from the communication log shown in FIG. 5 stored in communication log storage 220 in step S14011, acquires the device state indicating "power on" of the device (air conditioner) whose device identifier is "11:11:11:11:11:11" from the device state data shown in FIG. 3 stored in device state storage 200 in step S14012, and acquires "occupied" as the occupancy state in step S14013. Then, learner 140 associates the communication date and time indicating "2020/11/4 16:45:00", the device identifier indicating "11:

11:11:11:11:11", the device state indicating "power on", the occupancy state indicating "occupied", the communication volume indicating "15,000 byte", and the type of online communication indicating "global communication" with one another, and registers them as learning data.

The registration timing at which learner 140 registers the learning data in learning data storage 230 may be the same as the timing at which the communication log is stored in communication log storage 220, or may be an arbitrary timing. In the case where the learning data is registered at an arbitrary timing, learner 140 is required to store the device state and the occupancy state at the communication date and time of the communication log.

When registering the learning data, learner 140 generates the learning data by using all data acquired in steps S14011, S14012, and S14013. However, the configuration is not limited thereto. Learner 140 may perform, for example, outlier removal processing on at least one of the communication log, the device state data, and the occupancy state data. As the outlier removal processing, any known processing may be used, or, for example, processing using an interquartile range (IQR) may be used.

1.3.4.2 Details of Threshold Value Setting Processing

Figure 17:
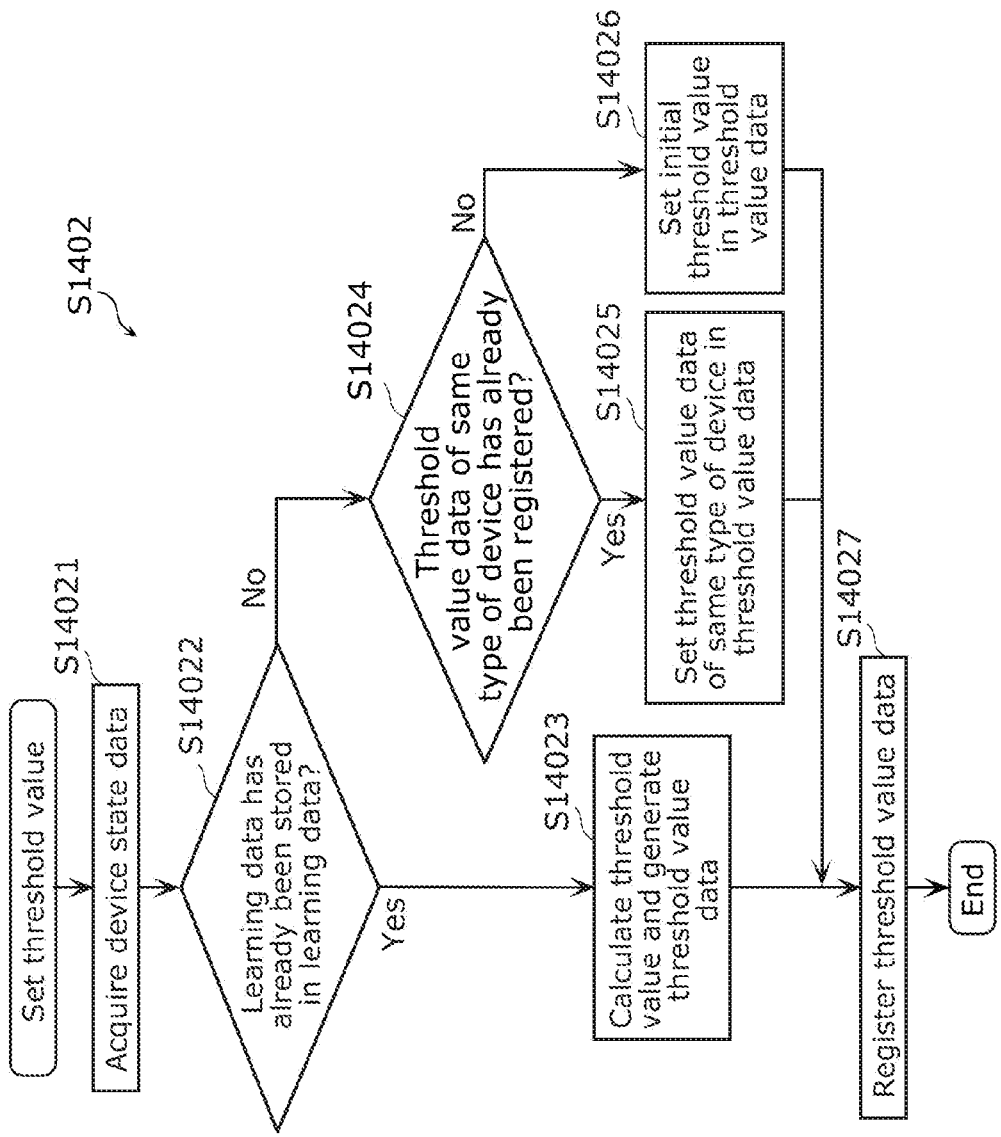
FIG. 17 is a flowchart illustrating an example of threshold value setting processing according to the embodiment.

FIG. 17 is a flowchart illustrating an example of the threshold value setting processing (S1402) according to the present embodiment.

(S14021) Learner 140 acquires the device state data stored in device state storage 200. Specifically, learner 140 acquires the device identifier (a MAC address or the like) and the type of device from the device state data stored in device state storage 200. Learner 140 may acquire the device identifier and the type of device of a specific device, or may acquire a list of devices registered in the device state data. In the case where a list of devices is acquired, learner 140 performs the processing operations in steps S14022 to S14027 repeatedly a number of times corresponding to the number of devices.

(S14022) Learner 140 determines whether the learning data of the pertinent device has been stored in the learning data stored in learning data storage 230. Specifically, learner 140 searches the learning data stored in learning data storage 230 for the learning data of the pertinent device by using the acquired device identifier (an MAC address or the like). If it is determined that the learning data of the pertinent device has been stored (Yes in S14022), learner 140 performs step S14023. If it is determined that the learning data of the pertinent device has not been stored (No in S14022), learner 140 performs step S14024.

(S14023) Learner 140 acquires the communication volume for each of the combinations of the device state, the occupancy state, and the type of online communication included in the learning data, and calculates the threshold value for each combination. Learner 140 calculates a number of threshold values corresponding to the number of combinations.

For example, in the case where the learning data shown in FIG. 6 is stored in learning data storage 23, when the device state, the occupancy state, and the type of online communication of the device identifier indicating "11:11:11:11:11:11" indicate "power on", "occupied", and "global communication", respectively, "7,500 byte" and "15,000 byte" are acquired as the communication volume. Here, in the case where "minimum value/maximum value" is set as the threshold value, "7,500/15,000 byte" is set as the threshold value. If three or more values are acquired as the communication volume when the device state, the occupancy state, and the type of online communication of the device identifier indicating "11:11:11:11:11:11" indicate "power on", "occupied", and "global communication", respectively, learner 140 sets one of the three or more values acquired as the communication volume that is smallest as the minimum value of the threshold value, and sets the largest one as the maximum value of the threshold value. However, learner 140 does not necessarily need to calculate both the minimum value and the maximum value as the threshold value, and may calculate at least one of the minimum value or the maximum value as the threshold value. Also, setting the smallest one of the values acquired as the communication volume as the minimum value of the threshold value and the largest one as the maximum value of the threshold value is an example of threshold value calculation. It can also be said that learner 140 determines the threshold value by setting the smallest one of the values acquired as the communication volume as the minimum value of the threshold value and the largest one as the maximum value of the threshold value.

The number of combinations of the device state, the occupancy state, and the type of online communication can be calculated by using the following equation: the number of patterns of the device state×the number of patterns of the occupancy state×the number of patterns of the type of online communication. For example, in the case where the number of patterns of the device state is two ("power on" and "power off"), the number of patterns of the occupancy state is two ("vacant" and "occupied"), and the number of patterns of the type of online communication is two ("local communication" and "global communication"), 2 (the number of patterns of the device state)×2 (the number of patterns of the occupancy state)×2 (the number of patterns of the type of online communication)=8, and thus 8 patterns of threshold value data are set for the threshold value of the pertinent device.

Alternatively, in the case where the occupancy state includes one or more items of human activity information, learner 140 may calculate the threshold value for each of the one or more items of activity information. Also, as described above, in the case where the occupancy state includes an occupied state and a vacant state, the threshold value may be calculated for each of the occupied state and the vacant state. Alternatively, in the case where the occupancy state includes at least one of the headcount of people at home or the location of the people, learner 140 may calculate the threshold value for each of the at least one of the headcount of people at home or the locations of the people.

In step S14023, learner 140 may acquire the communication volume for each of the combinations of the device state, the occupancy state, and the type of online communication, and perform outlier removal processing for removing outliers from the acquired communication volume. As the outlier removal processing, any known processing may be used, or, for example, processing using an interquartile range (IQR) may be used.

(S14024) Learner 140 determines whether the threshold value data of the same type of device has already been registered in the threshold value data stored in learning data storage 230 by using the type of device acquired. If it is determined that the threshold value data of the same type of device has already been registered (Yes in S14024), learner 140 performs step S14025. If it is determined that the threshold value data of the same type of device is not registered (No in S14024), learner 140 performs step S14026.

(S14025) Learner 140 sets the threshold value of the threshold value data of the same type of device as the threshold value data of the type of device of the pertinent device. Specifically, for example, when a new air conditioner is purchased, the threshold value of the already installed air conditioner is used. The threshold value data setting does not necessarily need to be performed. Whether the threshold value data setting is performed may be selected according to the type of device, and the method for performing the threshold value data setting may be changed.

(S14026) Learner 140 sets an initial threshold value as the threshold value of the type of device acquired. As the initial threshold value, the maximum and minimum values of total communication volume may be set, or the initial threshold value set by the manufacturer of the device may be set. If no is determined in step S14024, learner 140 may not set the threshold value. Alternatively, the anomaly detection device may set a learning period, and exclude the pertinent device from the anomaly detection target during the learning period.

(S14027) Learner 140 registers the generated threshold value data in learning data storage 230.

In the manner described above, learner 140 calculates the threshold value for detecting an anomaly in the communication log (or in other words, communication) for which detection is performed based on the actual record data of the communication volume in the past that corresponds to the device state and the occupancy state when the communication log for which detection is performed by the anomaly detection device was acquired (or in other words, when the communication was performed).

1.3.5 Operations of Anomaly Detection Processing

Figure 18:
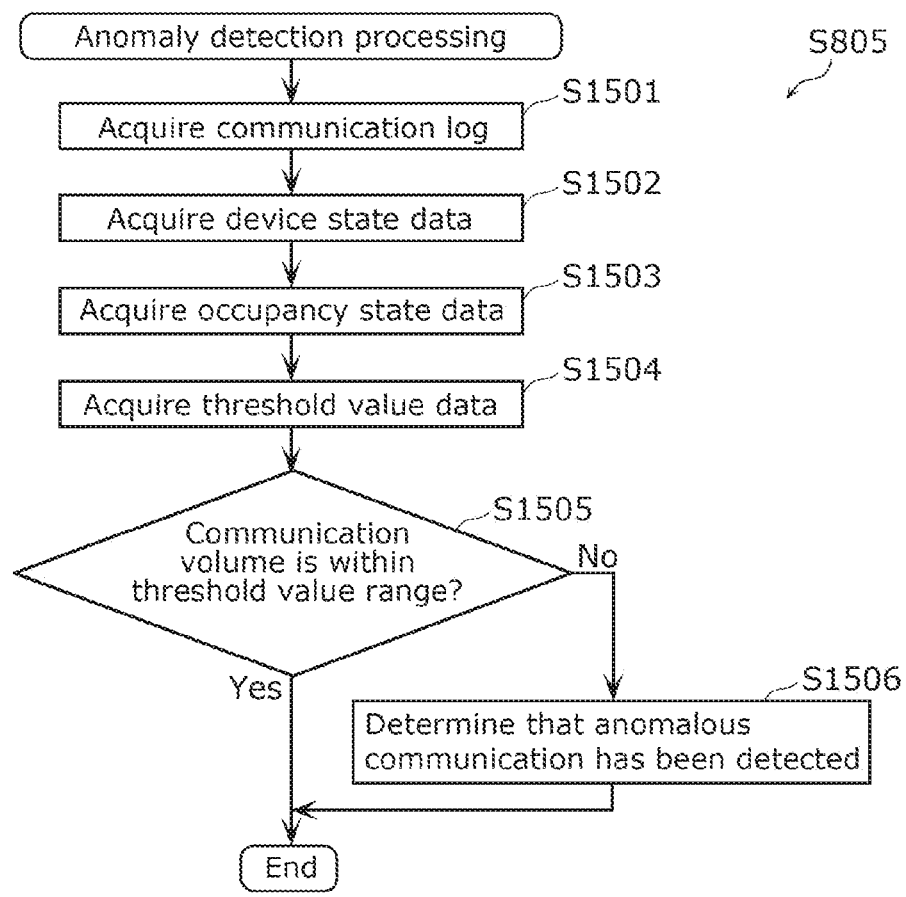
FIG. 18 is a flowchart illustrating an example of anomaly detection processing according to the embodiment.

FIG. 18 is a flowchart illustrating an example of the anomaly detection processing (S805) according to the present embodiment. FIG. 18 shows operations (the anomaly detection method) performed by anomaly detector 150.

(S1501) Anomaly detector 150 acquires a communication log of the detection target from the communication log stored in communication log storage 220. For example, anomaly detector 150 acquires the transmission source identifier (an MAC address or the like), the communication volume, and the type of online communication of the currently performed communication from the communication log stored in communication log storage 220. The current time is the time for which anomaly detection is performed, and is an example of a second period.

(S1502) Anomaly detector 150 acquires at least device state data including the device state of the second device. Alternatively, anomaly detector 150 may acquire the current device state of the target device from the device state data stored in device state storage 200 by using the transmission source identifier (an MAC address or the like).

(S1503) Anomaly detector 150 acquires occupancy state data. For example, anomaly detector 150 acquires the current occupancy state from the occupancy state data stored in occupancy state storage 210.

(S1504) Anomaly detector 150 acquires threshold value data. Anomaly detector 150 acquires the threshold value by selecting a threshold value corresponding to the device state acquired in step S1502 and the occupancy state acquired in step S1503 from the threshold value data based on the device state acquired in step S1502 and the occupancy state acquired in step S1503. For example, anomaly detector 150 acquires an appropriate threshold value from the threshold value data stored in learning data storage 230 based on the transmission source identifier, the type of online communication, the device state, and the occupancy state. For example, in the case where the threshold value data shown in FIG. 7 is used, when the device identifier of the device currently communicating indicates "11:11:11:11:11", the device state indicates "power on", the type of online communication indicates "local communication", and the current occupancy state indicates "vacant", anomaly detector 150 acquires "500/1,000 byte" as the threshold value (minimum value/maximum value).

In the manner described above, anomaly detector 150 selects a threshold value corresponding to the device state and the occupancy state at the current time (an example of a second period) from among the threshold values that correspond to the combinations of the device state, the occupancy state, and the type of online communication calculated by learner 140 (threshold value calculation device), and detects anomalous communication of the first device at the current time based on the selected threshold value and the communication log (for example, communication volume) at the current time.

(S1505) Anomaly detector 150 determines whether the communication volume is within a threshold value range. Specifically, anomaly detector 150 determines whether the acquired communication volume is within the range of the minimum threshold value and the maximum threshold value. If it is determined that the acquired communication volume is within the range of the minimum threshold value and the maximum threshold value (Yes in S1505), anomaly detector 150 ends the anomaly detection processing. If it is determined that the acquired communication volume is not within the range of the minimum threshold value and the maximum threshold value (the acquired communication volume is outside the threshold value range) (No in S1505), anomaly detector 150 performs step S1506. In step S1505, for example, anomaly detector 150 determines whether the acquired communication volume is within a range from a minimum value of 0 to a maximum value of 1,234.

(S1506) Anomaly detector 150 determines that anomalous communication has been detected, and transmits a notification to anomaly monitoring device 80 on Internet 10 via home gateway 20. Anomaly detector 150 compares the selected threshold value with the communication log. If the communication log does not satisfy the threshold value, anomaly detector 150 determines that the communication is anomalous communication, and outputs the determined result to anomaly monitoring device 80.

Anomaly detector 150 may perform the anomaly detection processing shown in FIG. 18 on each of the plurality of devices including the first device.

1.4 Advantageous Effects of Embodiment

In the present embodiment, the device state of each device is estimated from the communication log received by home gateway 20, the occupancy state is estimated based on information from the devices, and a threshold value for anomaly detection that corresponds to the device state and the occupancy state is set (selected). With this configuration, it is possible to reduce a detection failure that cannot be detected with the conventional techniques such as an anomalous operation of a device while the occupancy state is vacant, or an erroneous detection that occurs when the headcount of people at home is greater than the number of residents such as when a guest visits the home.

2. Other Variations

The present disclosure is of course not limited to the embodiment given above. For example, the following variations are also encompassed within the scope of the present disclosure.

(1) In the embodiment given above, the anomaly detection system is applied to a home network, but this is merely an embodiment of the anomaly detection system of the present disclosure, and thus the application of the anomaly detection system is not limited to a home network. For example, the anomaly detection system may be applied to a system in which a plurality of devices are connected to a network such as a building network, a factory network, or a vehicle network, and the device state and the occupancy state can be acquired via the network, or may be applied to any other network field. The home network, the building network, the factory network, the vehicle network, and the like are merely examples of in-facility networks. Also, in the embodiment given above, an example was described in which the term "people" refers to residents, but the present disclosure is not limited thereto. It may refer to users of a facility in which devices for which detection is performed by the anomaly detection system are provided.

(2) In the embodiment given above, the anomaly detection system is configured such that the devices including anomaly detection processing device 70 are connected to home gateway 20. However, home gateway 20 may have the functions of anomaly detection processing device 70, or a relay device such as a hub may be provided between home gateway 20 and the devices.

(3) In the embodiment given above, the devices may be connected to home network 11 using wired communication such as Ethernet (registered trademark), wireless communication such as Wi-Fi (registered trademark) or Bluetooth (registered trademark), or a combination thereof.

(4) In the embodiment given above, anomaly detector 150 of the anomaly detection system transmits a notification to anomaly monitoring device 80 when an anomaly is detected, but the notification destination is not limited thereto. For example, a notification may be transmitted to a device in which an anomaly has been detected, or to any another device connected to home network 11.

(5) Each of the devices used in the embodiment given above is specifically a computer system that includes a microprocessor, a ROM, a RAM, a hard disk unit, a display unit, a keyboard, a mouse, and the like. A computer program is recorded in the RAM or the hard disk unit. As a result of the microprocessor operating in accordance with the computer program, the device implements its functions. Here, the computer program is a program composed of a combination of a plurality of instruction codes that indicate instructions for the computer to achieve predetermined functions.

(6) Some or all of the structural elements that constitute each of the devices used in the embodiment given above may be composed of a single system LSI (Large Scale Integration). The system LSI is a super multifunctional LSI manufactured by integrating a plurality of structural elements on a single chip, and is specifically a computer system that includes a microprocessor, a ROM, a RAM, and the like. A computer program is stored in the RAM. The functions of the system LSI are implemented as a result of the microprocessor operating in accordance with the computer program.

(7) Some or all of the structural elements that constitute each of the devices used in the embodiment given above may be composed of an IC card or a single module that can be attached and detached to and from the device. The IC card or the module is a computer system that includes a microprocessor, a ROM, a RAM, and the like.

The IC card or the module may include the above-described super multifunctional LSI. The functions of the IC card or the module are implemented as a result of the microprocessor operating in accordance with a computer program. The IC card or the module may be tamper resistant.

(8) The present disclosure may be any of the methods described above. Alternatively, the present disclosure may be a computer program that implements the methods by using a computer, or may be a digital signal generated by the computer program.

(9) Alternatively, the present disclosure may be implemented by recording the computer program or the digital signal in a computer readable recording medium such as, for example, a flexible disk, a hard disk, a CD-ROM, an MO, a DVD, a DVD-ROM, a DVD-RAM, a BD (Blu-ray (registered trademark) Disc), or a semiconductor memory. Alternatively, the present disclosure may be a digital signal recorded in the recording medium.

(10) Alternatively, the present disclosure may be implemented by transmitting the computer program or the digital signal via a telecommunication line, a wireless or wired communication line, a network as typified by the Internet, data broadcasting, or the like.

(11) Alternatively, the present disclosure may be implemented by a computer system that includes a microprocessor and a memory, wherein the computer program described above is recorded in the memory, and the microprocessor operates in accordance with the computer program.

(12) Alternatively, the present disclosure may be implemented by an independent computer system by recording the program or the digital signal on a recording medium and transferring the program or the digital signal, or by transferring the program or the digital signal via a network or the like.

(13) Also, the functional blocks shown in the block diagrams are merely exemplary. Accordingly, it is possible to implement a plurality of functional blocks as a single functional block, or divide a single functional block into a plurality of blocks. Alternatively, some functions may be transferred to other functional blocks. Also, the functions of a plurality of functional blocks that have similar functions may be processed by a single piece of hardware or software in parallel or by time division.

(14) Also, the order of a plurality of processing operations described in the embodiment given above is merely exemplary. The order of a plurality of processing operations may be changed. The plurality of processing operations may be performed in parallel. Also, some of the plurality of processing operations may not be performed.

(15) Also, the anomaly detection processing device according to the embodiment and the like given above may be implemented by a single device or a plurality of devices. In the case where the anomaly detection processing device is implemented by a plurality of devices, there is no limitation on how the structural elements of the anomaly detection processing device are assigned to the plurality of devices. In the case where the anomaly detection processing device is implemented by a plurality of devices, the communication method for performing communication between the plurality of devices is not specifically limited, and may be wireless communication or wired communication. Alternatively, the communication between the devices may be performed using a combination of wireless communication and wired communication. In the anomaly detection processing device, for example, the threshold value calculation device and the anomaly detection device may be implemented by different devices.

(16) Also, in the case where the threshold value calculation device and the anomaly detection device are implemented by different devices, the threshold value calculation device may transmit the threshold value data shown in FIG. 7 to the anomaly detection device. Alternatively, the threshold value calculation device may acquire the device state and the occupancy state when the communication volume of the detection target was acquired from the anomaly detection device, select, from the threshold value data, a threshold value corresponding to the device state and the occupancy state that were acquired, and transmit only the selected threshold value to the anomaly detection device.

(17) Also, an example was described in which the threshold value calculation device calculates the threshold value for each of the combinations of at least the device state and the occupancy state, but the present disclosure is not limited thereto. The threshold value calculation device may acquire the device state and the occupancy state when the anomaly detection device performs communication with the detection target, calculate, based on the learning data, the threshold value for the device state and the occupancy state that were acquired, and transmit the calculated threshold value to the anomaly detection device. That is, threshold value data generation is not necessarily essential.

(18) Other embodiments obtained by making various modifications that can be conceived by a person having ordinary skill in the art to the above embodiment as well as embodiments implemented by any combination of the structural elements and the functions of the above embodiment without departing from the scope of the one aspect of the present disclosure are also encompassed in the scope of the present disclosure.

INDUSTRIAL APPLICABILITY

According to the present disclosure, it is possible to detect an anomaly in the communication of home devices provided in a home according to the operating state of the home devices and the occupancy state by residents. It is also possible to detect an anomaly in the communication of devices provided in a place other than a home such as a building, a store, a factory, or a vehicle that are connected to a local network that is connected to the Internet via a router or any other device.

The invention claimed is:

1. A threshold value calculation device that calculates a threshold value used by an anomaly detection device that detects anomalous communication of a first device that is connected to an in-facility network and provided in a facility in which the in-facility network is installed and a second device that is different from the first device is provided, the threshold value calculation device comprising:
a processor; and
a memory including a computer program that, when executed by the processor, causes the processor to perform functions, the functions including:
acquiring a device state of the first device during a first period;
determining an occupancy state by people in the facility during the first period based on information acquired from the second device;
collecting a communication log generated based on communication transmitted and received by the first device during the first period; and
calculating the threshold value for the communication transmitted and received by the first device during a second period that is after the first period based on the device state, the occupancy state, and the communication log,
wherein the device state includes one or more states of the first device,
the occupancy state includes one or more states of the people, and
the processor calculates the threshold value for each of combinations of the one or more states of the first device and the one or more states of the people.

2. The threshold value calculation device according to claim 1,
wherein the processor acquires, as the device state, at least one of a power state or a setpoint value of the first device based on communication that includes a device control command for controlling the first device.

3. The threshold value calculation device according to claim 1,
wherein the processor determines the occupancy state based on information acquired from the first device or a third device that is different from the first device and the second device.

4. The threshold value calculation device according to claim 1,
wherein the communication log includes type information indicating a type of online communication determined based on a transmission destination identifier specified in the communication log,
the type information includes one or more types of online communication in the communication log, and
the processor further calculates the threshold value for each of combinations of the one or more types of online communication.

5. The threshold value calculation device according to claim 1,
wherein the processor generates learning data in which the device state, the occupancy state, and the communication log are associated with one another, and calculates the threshold value based on the learning data.

6. The threshold value calculation device according to claim 1,
wherein the occupancy state includes an occupied state of the facility by the people and a vacant state, and
the processor calculates the threshold value for each of the occupied state and the vacant state.

7. The threshold value calculation device according to claim 1,
wherein the occupancy state includes at least one of a headcount or a location of the people in the facility, and
the processor calculates the threshold value for each of the at least one of the headcount or the location.

8. The threshold value calculation device according to claim 1,
wherein the occupancy state includes one or more items of activity information of the people during the first period, and
the processor further calculates the threshold value based on the one or more items of activity information.

9. The threshold value calculation device according to claim 1,
wherein the threshold value is for a communication volume of the first device, and includes a maximum value and a minimum value of the communication volume.

10. An anomaly detection device that detects the anomalous communication of the first device that is connected to the in-facility network and provided in the facility in which the in-facility network is installed and the second device that is different from the first device is provided, the anomaly detection device comprising:
a second processor; and
a second memory including a second computer program that, when executed by the second processor, causes the second processor to perform second functions, the second functions including:
acquiring a second device state of the first device during the second period that is after the first period;
determining a second occupancy state by the people in the facility during the second period based on second information acquired from the second device;
collecting a second communication log generated based on second communication transmitted and received by the first device during the second period; and
selecting the threshold value corresponding to the second device state and the second occupancy state during the second period from among threshold values calculated by the threshold value calculation device according to claim 1 for the combinations of the one or more states of the first device and the one or more states of the people, and detecting the anomalous communication of the first device during the second period based on the threshold value selected and the second communication log.

11. The anomaly detection device according to claim 10, wherein the second processor compares the threshold value selected with the second communication log, and when the second communication log does not satisfy the threshold value selected, the second processor determines that an anomaly has occurred, and outputs a determination result.

12. A threshold value calculation method for calculating a threshold value used by an anomaly detection device that detects anomalous communication of a first device that is connected to an in-facility network and provided in a facility in which the in-facility network is installed and a second device that is different from the first device is provided, the threshold value calculation method comprising:
acquiring, by a processor, a device state of the first device during a first period;
determining, by the processor, an occupancy state by people in the facility during the first period based on information acquired from the second device;
collecting, by the processor, a communication log generated based on communication transmitted and received by the first device during the first period; and
calculating, by the processor, the threshold value for the communication transmitted and received by the first device during a second period that is after the first period based on the device state, the occupancy state, and the communication log,
wherein the device state includes one or more states of the first device,
the occupancy state includes one or more states of the people, and
the calculating of the threshold value by the processor includes calculating the threshold value for each of combinations of the one or more states of the first device and the one or more states of the people.

13. An anomaly detection method for detecting the anomalous communication of the first device that is connected to the in-facility network and provided in the facility in which the in-facility network is installed and the second device that is different from the first device is provided, the anomaly detection method comprising:
acquiring, by a second processor, a second device state of the first device during the second period that is after the first period;
determining, by the second processor, a second occupancy state by the people in the facility during the second period based on second information acquired from the second device;
collecting, by the second processor, a second communication log generated based on second communication transmitted and received by the first device during the second period; and
selecting, by the second processor, the threshold value corresponding to the second device state and the second occupancy state during the second period from among threshold values calculated by the threshold value calculation method according to claim 12 for the combinations of the one or more states of the first device and the one or more states of the people, and detecting, by the second processor, the anomalous communication of the first device during the second period based on the threshold value selected and the second communication log.

* * * * *